(12) United States Patent
Johnson et al.

(10) Patent No.: US 12,193,352 B2
(45) Date of Patent: Jan. 14, 2025

(54) PRODUCT CONTROL ASSEMBLY FOR AN AGRICULTURAL PRODUCT METER

(71) Applicant: CNH Industrial America LLC, New Holland, PA (US)

(72) Inventors: Chad Michael Johnson, Arlington Heights, IL (US); Joao Augusto Bello de Carvalho, Piracicabo (BR); Daniel Repke, Piracicaba (BR); Carlos Alexandre Giusti, Piracicaba (BR); Bruno Henrique Santos Nunes, Piracicaba (BR)

(73) Assignee: CNH Industrial America LLC, New Holland, PA (US)

( * ) Notice: Subject to any disclaimer, the term of this patent is extended or adjusted under 35 U.S.C. 154(b) by 818 days.

(21) Appl. No.: 17/407,616

(22) Filed: Aug. 20, 2021

(65) Prior Publication Data

US 2022/0287223 A1    Sep. 15, 2022

Related U.S. Application Data

(60) Provisional application No. 63/160,253, filed on Mar. 12, 2021.

(51) Int. Cl.
*A01C 7/04*    (2006.01)
*A01C 7/16*    (2006.01)
*A01C 7/20*    (2006.01)

(52) U.S. Cl.
CPC .............. *A01C 7/046* (2013.01); *A01C 7/16* (2013.01); *A01C 7/20* (2013.01)

(58) Field of Classification Search
CPC .............. A01C 7/046; A01C 7/16; A01C 7/20
See application file for complete search history.

(56) References Cited

U.S. PATENT DOCUMENTS

| 4,379,664 A | 4/1983 | Klein et al. |
| 4,514,114 A | 4/1985 | Fuss et al. |

(Continued)

FOREIGN PATENT DOCUMENTS

| CN | 107896587 | 4/2018 |
| DE | 3633955 | 5/1987 |

(Continued)

OTHER PUBLICATIONS

Precision Planting, vSet 2 1790 Flap Kit Installation manual, Feb. 7, 2019, 4 pgs.

*Primary Examiner* — Tara Mayo
(74) *Attorney, Agent, or Firm* — Rebecca Henkel; Peter K. Zacharias; Rickard K. DeMille

(57) ABSTRACT

A product control assembly for an agricultural product meter includes a first product control barrier configured to extend along a product path. The product path extends from an agricultural product storage area to an outlet, the first product control barrier includes a first portion and a second portion, the second portion is pivotally coupled to the first portion, the second portion is configured to contact an outlet barrier while the agricultural product meter is in a non-working position. The product control assembly also includes a second product control barrier configured to form an end of the agricultural product storage area and to be spaced apart from the outlet barrier, and the first and second product control barriers are configured to cooperate to substantially block flow of the agricultural product from the agricultural product storage area into the outlet while the agricultural product meter is in the non-working position.

20 Claims, 12 Drawing Sheets

(56) References Cited

U.S. PATENT DOCUMENTS

| | | |
|---|---|---|
| 4,522,291 A | 6/1985 | Smick |
| 5,058,766 A | 10/1991 | Deckler |
| 5,170,909 A | 12/1992 | Lundie et al. |
| 6,581,533 B1 | 6/2003 | Hagen et al. |
| 7,093,548 B2 | 8/2006 | Eben et al. |
| 7,152,542 B2 | 12/2006 | Eben et al. |
| 7,334,532 B2 | 2/2008 | Sauder et al. |
| 7,661,377 B2 | 2/2010 | Keaton et al. |
| 7,699,009 B2 | 4/2010 | Sauder et al. |
| 8,375,873 B2 | 2/2013 | Nelson et al. |
| 8,375,874 B2 | 2/2013 | Peterson et al. |
| 8,511,242 B2 | 8/2013 | Applegate et al. |
| 8,573,917 B2 | 11/2013 | Renyer |
| 8,733,258 B2 | 5/2014 | Patwardhan et al. |
| 8,752,490 B2 | 6/2014 | Beaujot |
| 8,850,997 B2 | 10/2014 | Silbernagel et al. |
| 9,332,688 B2 | 5/2016 | Zumdome et al. |
| 9,351,440 B2 | 5/2016 | Sauder |
| 9,451,740 B2 | 9/2016 | Kowalchuk |
| 9,491,901 B2 | 11/2016 | Gentili |
| 9,578,798 B2 | 2/2017 | Scheideler |
| 9,596,802 B2 | 3/2017 | Funck |
| 9,675,002 B2 | 6/2017 | Roszman |
| 9,775,279 B2 | 10/2017 | Garner et al. |
| 10,405,483 B2 | 9/2019 | Schaefer et al. |
| 10,750,658 B2 | 8/2020 | Schoeny et al. |
| 10,750,663 B2 | 8/2020 | Garner et al. |
| 10,827,670 B2 | 11/2020 | Garner et al. |
| 2019/0364719 A1 | 12/2019 | Garner et al. |

FOREIGN PATENT DOCUMENTS

| | | |
|---|---|---|
| EP | 0597196 | 5/1994 |
| WO | 2015168198 | 11/2015 |
| WO | 2019241855 | 12/2019 |

PRODUCT CONTROL ASSEMBLY FOR AN AGRICULTURAL PRODUCT METER

CROSS-REFERENCE TO RELATED APPLICATION

This application claims priority from and the benefit of U.S. Provisional Application Ser. No. 63/160,253, entitled "PRODUCT CONTROL ASSEMBLY FOR AN AGRICULTURAL PRODUCT METER", filed Mar. 12, 2021, which is hereby incorporated by reference in its entirety.

BACKGROUND

The present disclosure relates generally to a product control assembly for an agricultural product meter.

Generally, planting implements (e.g., planters) are towed behind a tractor or other work vehicle via a mounting bracket secured to a rigid frame of the implement. Planting implements typically include multiple row units distributed across a width of the implement. Each row unit is configured to deposit agricultural product (e.g., seed, fertilizer, etc.) at a desired depth beneath the soil surface of a field, thereby establishing rows of planted agricultural product. For example, each row unit typically includes a ground engaging tool or opener that forms a path (e.g., trench) for agricultural product deposition into the soil. An agricultural product conveying system (e.g., seed tube or powered agricultural product conveyor) is configured to deposit the agricultural product into the trench. The opener/agricultural product conveying system may be followed by closing discs that move displaced soil back into the trench and/or a packer wheel that packs the soil on top of the deposited agricultural product. Furthermore, each row unit may include an agricultural product meter configured to control a flow of the agricultural product into the agricultural product conveying system, thereby controlling agricultural product spacing within the soil.

In certain planting implements, at least a portion of the row units may be rotated in a forward direction from a working position to a non-working position (e.g., headland position, transport position, etc.). As the row unit(s) rotate in the forward direction, gravity drives the agricultural product to move within the respective agricultural product meter(s). For example, the agricultural product may move from an agricultural product storage area to an outlet of the agricultural product meter. The agricultural product may then move through the outlet and the agricultural product conveying system to the ground (e.g., surface of a road, surface of an implement storage area, etc.). As a result, the amount of agricultural product within the row unit(s) may be reduced, thereby reducing the efficiency of the planting process. Furthermore, for each row unit in which the agricultural product conveying system includes a powered agricultural product conveyor, the agricultural product may collect within the powered agricultural product conveyor while the respective row unit is in the non-working position, thereby interfering with operation of the powered agricultural product conveyor when planting operations are resumed.

BRIEF DESCRIPTION

In certain embodiments, a product control assembly for an agricultural product meter includes a first product control barrier configured to extend along a product path toward an outlet barrier. The product path extends from an agricultural product storage area to an outlet, the outlet barrier is configured to form a portion of the outlet, the first product control barrier includes a first portion and a second portion, the first portion is configured to couple to a housing of the agricultural product meter, the second portion is pivotally coupled to the first portion, the second portion is configured to contact the outlet barrier while the agricultural product meter is in a non-working position (e.g., headland position, transport position, etc.) to substantially block flow of agricultural product from the agricultural product storage area into the outlet, and the second portion is configured to be spaced apart from the outlet barrier while the agricultural product meter is in a working position to enable excess agricultural product to flow through a gap between the second portion and the outlet barrier from the product path to the agricultural product storage area. The product control assembly also includes a second product control barrier configured to form an end of the agricultural product storage area. The second product control barrier is configured to be spaced apart from the outlet barrier to enable the excess agricultural product to flow into the agricultural product storage area, and the first and second product control barriers are configured to cooperate to substantially block flow of the agricultural product from the agricultural product storage area into the outlet while the agricultural product meter is in the non-working position.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
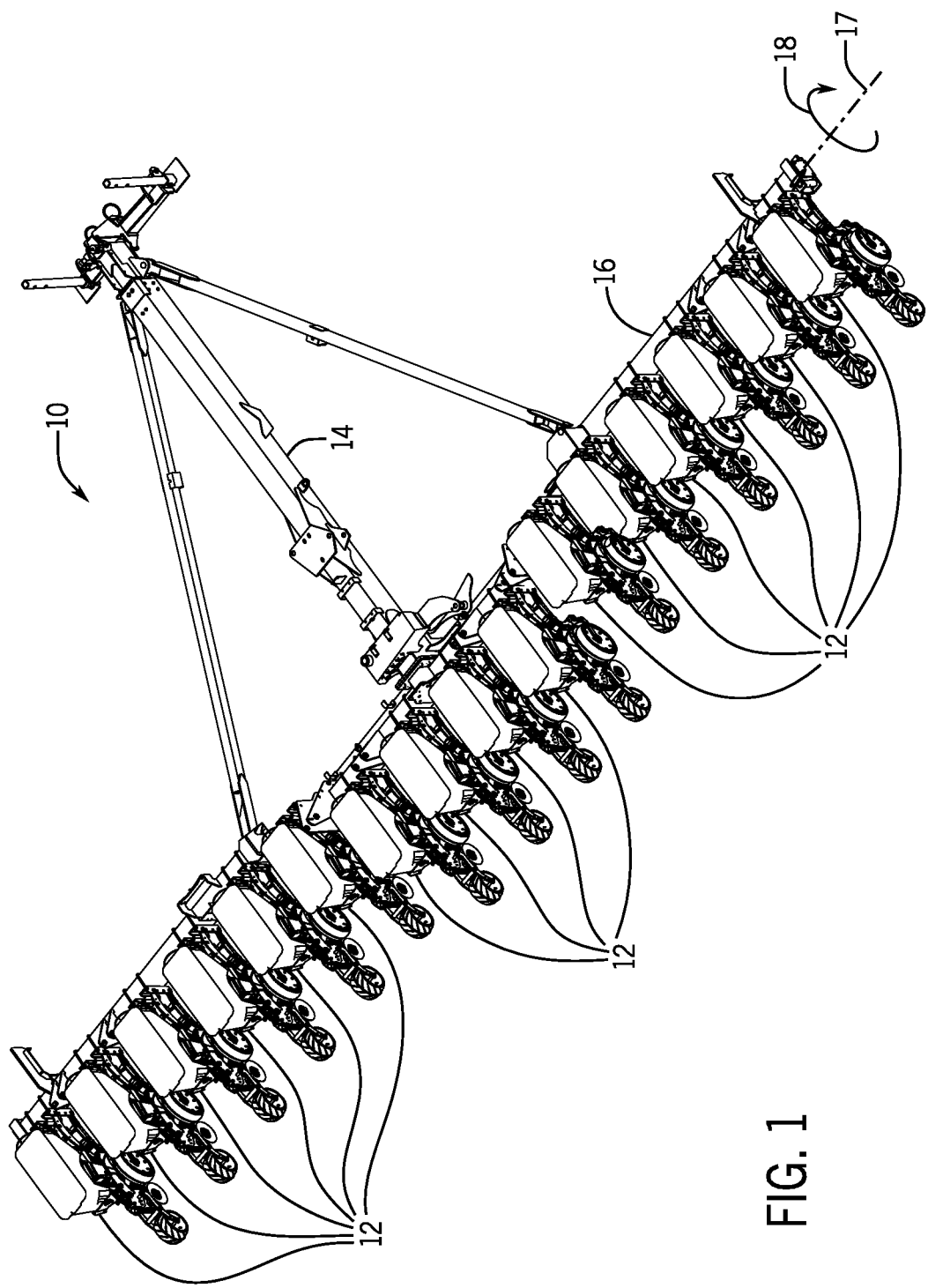
FIG. 1 is a perspective view of an embodiment of an agricultural implement having multiple row units distributed across a width of the agricultural implement.

FIG. 1 is a perspective view of an embodiment of an agricultural implement 10 (e.g., planting implement) having multiple row units 12 distributed across a width of the agricultural implement 10. The agricultural implement 10 is configured to be towed through a field behind a work vehicle, such as a tractor. As illustrated, the agricultural implement 10 includes a tongue assembly 14, which includes a hitch configured to couple the agricultural implement 10 to an appropriate tractor hitch (e.g., via a ball, clevis, or other coupling). The tongue assembly 14 is coupled to a tool bar 16 which supports multiple row units 12. Each row unit 12 may include one or more opener discs configured to form a path (e.g., trench) within soil of a field. The row unit 12 may also include an agricultural product conveying system (e.g., seed tube or powered agricultural product conveyer) configured to deposit agricultural product (e.g., seed, fertilizer, etc.) into the path/trench. In addition, the row unit 12 may include closing disc(s) and/or a packer wheel positioned behind the agricultural product conveying system. The closing disc(s) are configured to move displaced soil back into the path/trench, and the packer wheel is configured to pack soil on top of the deposited agricultural product. Furthermore, the row unit 12 may include an agricultural product meter configured to control a flow of the agricultural product into the agricultural product conveying system, thereby controlling agricultural product spacing within the soil.

In certain embodiments, at least a portion of the row units 12 may be rotated upwardly about a lateral axis 17 from the illustrated working position to a non-working position (e.g., headland position, transport position, etc.). For example, at least a portion of the toolbar 16 may be rotated in a forward direction 18 about the lateral axis 17, thereby rotating the row units 12 coupled to the toolbar 16/portion of the toolbar 16 from the working position to the non-working position. Additionally or alternatively, one or more row units 12 may be rotated relative to the toolbar 16 in the forward direction 18 from the working position to the non-working position. As the row unit(s) 12 rotate in the forward direction 18, gravity drives the agricultural product to move within the respective agricultural product meter(s). Accordingly, at least one agricultural product meter (e.g., each agricultural product meter of the agricultural implement 10) may include a product control assembly configured to substantially block flow of the agricultural product from the agricultural product meter to the agricultural product conveying system while the respective row unit 12 is in the non-working position.

In certain embodiments, the product control assembly includes a first product control barrier extending along a product path toward an outlet barrier. As discussed in detail below, the product path extends from an agricultural product storage area to an outlet, and the outlet barrier forms a portion of the outlet. The first product control barrier includes a first portion and a second portion. The first portion is coupled (e.g., non-movably coupled) to a housing of the agricultural product meter, and the second portion is pivotally coupled to the first portion. The second portion is configured to contact the outlet barrier while the row unit is in the non-working position to substantially block flow of agricultural product from the agricultural product storage area into the outlet. The second portion is also configured to be spaced apart from the outlet barrier while the row unit is in the working position to enable excess agricultural product to flow through a gap between the second portion and the outlet barrier from the product path to the agricultural product storage area. In addition, the product control assembly includes a second product control barrier forming an end of the agricultural product storage area. The second product control barrier is spaced apart from the outlet barrier to enable the excess agricultural product to flow into the agricultural product storage area. As discussed in detail below, the first and second product control barriers are configured to cooperate to substantially block flow of the agricultural product from the agricultural product storage area into the outlet while the row unit is in the non-working position.

Furthermore, in certain embodiments, the product control assembly includes a first product control barrier extending from an outlet barrier toward an agricultural product storage area. As previously discussed, the outlet barrier forms a portion of an outlet of the agricultural product meter. In addition, the product control assembly includes a second barrier forming an end of the agricultural product storage area. The first product control barrier is spaced apart from the second product control barrier to enable excess agricultural product to flow from a product path to the agricultural product storage area. Furthermore, the second product control barrier is spaced apart from the outlet barrier to enable the excess agricultural product to flow into the agricultural product storage area. In certain embodiments, the first product control barrier extends from an angled portion of the outlet barrier and establishes a larger gap between the first and second product control barriers. In other embodiments, the first product control barrier extends from an intersection between the angled portion of the outlet barrier and a substantially vertical portion of the outlet barrier and establishes a smaller gap between the first and second product control barriers. As discussed in detail below, the first and second product control barriers are configured to cooperate to substantially block flow of the agricultural product from the agricultural product storage area into the outlet while the row unit is in the non-working position.

Figure 2:
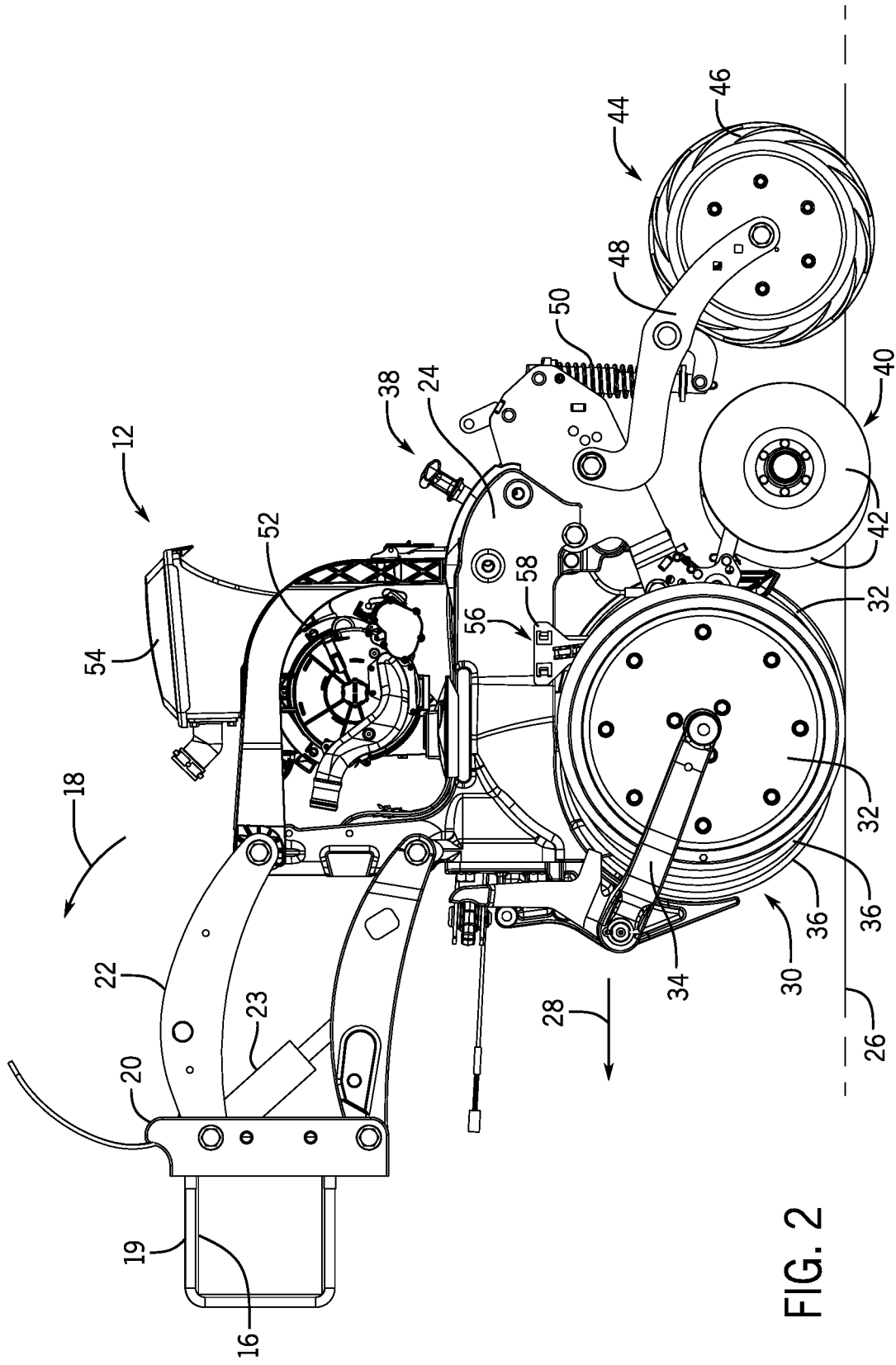
FIG. 2 is a side view of an embodiment of a row unit that may be employed on the agricultural implement of FIG. 1.

FIG. 2 is a side view of an embodiment of a row unit 12 (e.g., agricultural row unit) that may be employed on the agricultural implement of FIG. 1. The row unit 12 includes a mount 19 configured to secure the row unit 12 to the tool bar 16 of the agricultural implement. In the illustrated embodiment, the mount 19 includes a U-bolt that secures a bracket 20 of the row unit 12 to the tool bar 16. However, in alternative embodiments, the mount may include another suitable device that couples the row unit to the tool bar. A linkage assembly 22 extends from the bracket 20 to a frame 24 of the row unit 12. The linkage assembly 22 is configured to enable vertical movement of the frame 24 relative to the tool bar 16 in response to variations in a soil surface 26. In the illustrated embodiment, an actuator 23 (e.g., hydraulic actuator, pneumatic actuator, electromechanical actuator, etc.) is configured to urge the frame 24 toward the soil surface 26. While the illustrated linkage assembly 22 is a parallel linkage assembly (e.g., a four-bar linkage assembly), in other embodiments, another suitable linkage assembly may extend between the bracket and the frame. In certain embodiments, the toolbar 16 is configured to be driven to rotate about the lateral axis (e.g., by one or more actuators), thereby rotating the row unit 12 in the forward direction 18 from the illustrated working position to the non-working position (e.g., headland position, transport position, etc.). Furthermore, in certain embodiments, the toolbar may be coupled to a second tool bar by a linkage, and an actuator may drive the first toolbar to rotate relative to the second toolbar, thereby rotating the row unit in the forward direction from the illustrated working position to the non-working position.

The row unit 12 is configured to deposit agricultural product (e.g., seed, fertilizer, etc.) at a target depth beneath the soil surface 26 as the row unit 12 traverses a field along a direction of travel 28. The row unit 12 includes an opener assembly 30 that forms a trench in the soil for agricultural product deposition into the soil. In the illustrated embodiment, the opener assembly 30 includes gauge wheels 32, arms 34 that pivotally couple the gauge wheels 32 to the frame 24, and opener discs 36. The opener discs 36 are configured to excavate a trench into the soil, and the gauge wheels 32 are configured to control a penetration depth of the opener discs 36 into the soil. In the illustrated embodiment, the row unit 12 includes a depth control system 38 configured to control the vertical position of the gauge wheels 32 (e.g., by blocking rotation of the arms in the upward direction beyond a selected orientation), thereby controlling the penetration depth of the opener discs 36 into the soil.

The row unit 12 also includes an agricultural product conveying system (e.g., seed tube or powered agricultural product conveyor) configured to deposit agricultural product (e.g., seed, fertilizer, etc.) into the trench. The opener assembly 30 and the agricultural product conveying system are followed by a closing assembly 40 that moves displaced soil back into the trench. In the illustrated embodiment, the closing assembly 40 includes two closing discs 42. However, in other embodiments, the closing assembly may include other suitable closing device(s) (e.g., a single closing disc, etc.). In addition, in certain embodiments, the closing assembly may be omitted. In the illustrated embodiment, the closing assembly 40 is followed by a packing assembly 44 configured to pack soil on top of the deposited agricultural product. The packing assembly 44 includes a packer wheel 46, an arm 48 that pivotally couples the packer wheel 46 to the frame 24, and a biasing member 50 configured to urge the packer wheel 46 toward the soil surface 26, thereby enabling the packer wheel to pack soil on top of the deposited agricultural product. While the illustrated biasing member 50 includes a spring, in other embodiments, the biasing member may include another suitable biasing device, such as a hydraulic cylinder or a pneumatic cylinder, among others. Furthermore, in certain embodiments, the packing assembly may be omitted.

The row unit 12 includes a vacuum agricultural product meter 52 configured to receive agricultural product (e.g., seed, fertilizer, etc.) from a hopper 54. In certain embodiments, the vacuum agricultural product meter 52 includes a disc having multiple openings. An air pressure differential between opposite sides of the disc induces the agricultural product (e.g., seed, etc.) to be captured within the openings. As the disc rotates, the agricultural product is conveyed toward the agricultural product conveying system. Once the agricultural product (e.g., seed, etc.) enters an outlet that extends to the agricultural product conveying system, the air pressure on each side of the disc is substantially equalized (e.g., at the end of a vacuum passage), thereby enabling the agricultural product (e.g., seed, etc.) to enter the agricultural product conveying system (e.g., seed tube or powered agricultural product conveyor). The agricultural product conveying system then directs the agricultural product to the trench. While the illustrated embodiment includes a vacuum agricultural product meter, in other embodiments, other suitable types of agricultural product meters may be utilized. As used herein, "vacuum" refers to an air pressure that is less than the ambient atmospheric air pressure, and not necessarily 0 pa.

In the illustrated embodiment, the row unit 12 includes a scraper assembly 56 having an outer scraper 58 coupled to the frame 24 and configured to engage an outer surface of an opener disc 36. Furthermore, in certain embodiments, the scraper assembly may include an inner scraper configured to engage an inner surface of the opener disc 36. The scraper assembly 56 is configured to remove accumulated soil from the opener disc 36, thereby enhancing the accuracy and efficiency of the seed path/trench forming process. Furthermore, in certain embodiments, the scraper assembly may include a second outer scraper and, in certain embodiments, a second inner scraper configured to remove accumulated soil from a second opener disc of the row unit.

While the row unit/agricultural product meter is in the working position, the agricultural product meter may be activated, which drives the disc to rotate, thereby flowing metered agricultural product to the agricultural product conveying system. Furthermore, before rotating the row unit/agricultural product meter to the non-working position (e.g., headland position, transport position, etc.), the agricultural product meter is deactivated, which terminates rotation of the disc, thereby terminating metered agricultural product flow to the agricultural product conveying system. As discussed in detail below, the agricultural product meter 52 may include a product control assembly configured to substantially block flow of the agricultural product from the agricultural product meter to the agricultural product conveying system while the row unit 12/agricultural product meter 52 is in the non-working position. The product control assembly may include multiple barriers configured to cooperate to substantially block flow of the agricultural product from an agricultural product storage area of the agricultural product meter to an outlet of the agricultural product meter while the agricultural product meter is in the non-working position. The barriers of the product control assembly are also configured to enable excess agricultural product to flow from a product path of the agricultural product meter to the agricultural product storage area while the agricultural product meter is in the working position.

Figure 3:
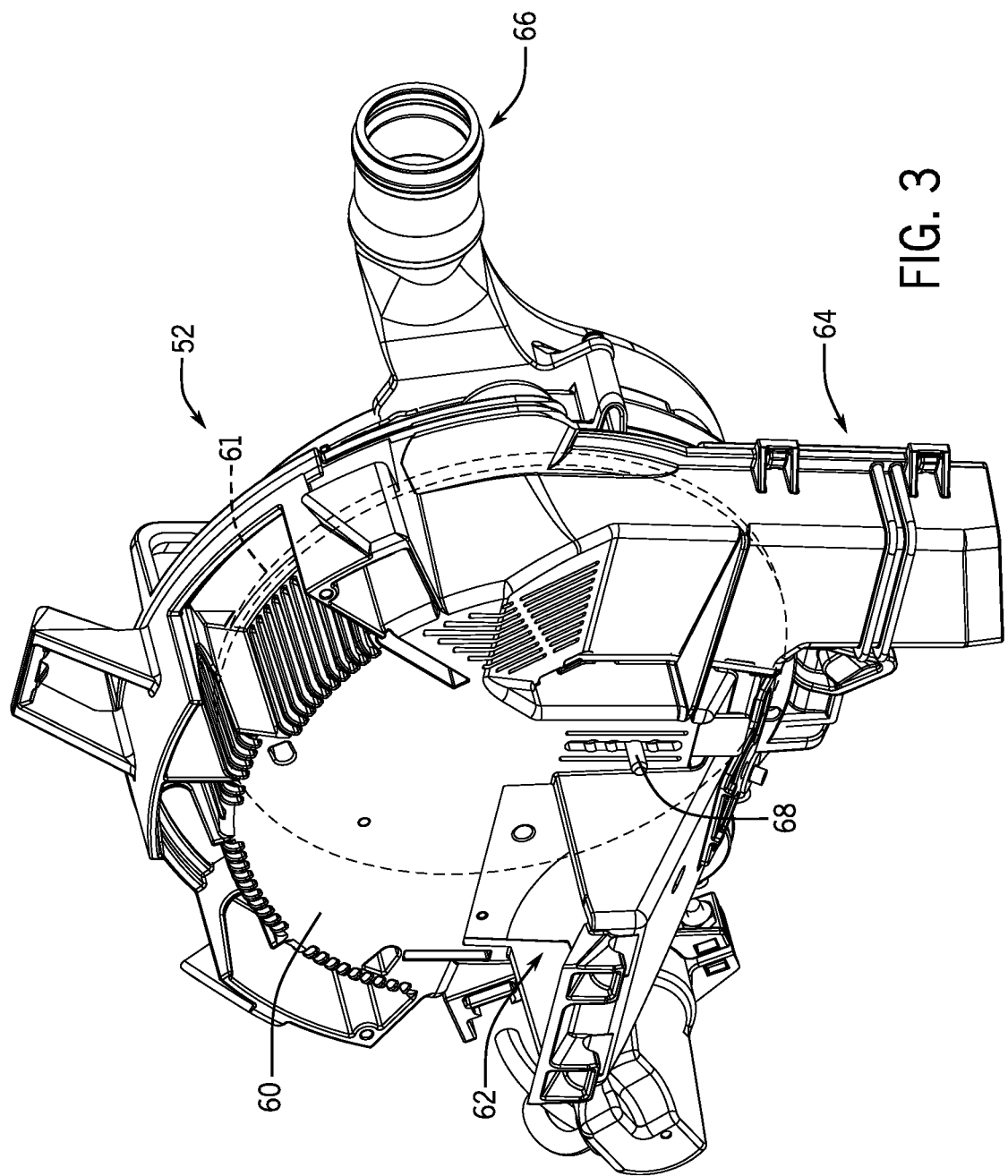
FIG. 3 is a perspective view of an embodiment of an agricultural product meter that may be employed within the row unit of FIG. 2.

FIG. 3 is a perspective view of an embodiment of an agricultural product meter 52 that may be employed within the row unit of FIG. 2. In the illustrated embodiment, the agricultural product meter 52 has a housing 60 that houses various components of the agricultural product meter 52, such as the disc 61, a singulator, and a movable baffle, among other components. The housing 60 forms an inlet 62 configured to receive agricultural product (e.g., seed, etc.) from the hopper, and the housing 60 forms an outlet 64 configured to direct the agricultural product to the agricultural product conveying system. The housing 60 also forms a vacuum port 66 configured to couple to a vacuum source (e.g., fan, blower, etc.). In the illustrated embodiment, the housing 60 is formed by two portions coupled to one another. However, in other embodiments, the housing may be formed by any suitable number of portions.

During operation of the agricultural product meter 52, the agricultural product flows through the inlet 62 from the hopper to an agricultural product storage area within the agricultural product meter 52. An air pressure differential between opposite sides of the disc 61 induces the agricultural product (e.g., seed, etc.) within the agricultural product storage area to be captured within openings of the disc. As the disc rotates, the agricultural product is conveyed along a product path from the agricultural product storage area to the outlet 64. Once the agricultural product (e.g., seed, etc.) enters the outlet, the air pressure on each side of the disc is substantially equalized (e.g., at the end of a vacuum passage that is fluidly coupled to the vacuum port 66), thereby enabling the agricultural product (e.g., seed, etc.) to flow through the outlet 64 to the agricultural product conveying system (e.g., seed tube or powered agricultural product conveyor).

In the illustrated embodiment, the agricultural product meter 52 includes a movable baffle configured to control flow of the agricultural product between the inlet 62 and the agricultural product storage area. A pin 68 is coupled to the movable baffle, and the movable baffle may be moved between multiple positions (e.g., via the pin, via manual movement of the movable baffle, etc.), thereby controlling the flow of the agricultural product between the inlet 62 and the agricultural product storage area. For example, a position of the movable baffle may be selected based on the type of agricultural product (e.g., seed, etc.) within the hopper. In certain embodiments, the agricultural product meter housing may include multiple recesses disposed along a slot, in which each recess corresponds to a respective position of the movable baffle, and the pin may move along the slot and engage a selected recess, thereby substantially maintaining the movable baffle in a selected position.

Figure 4:
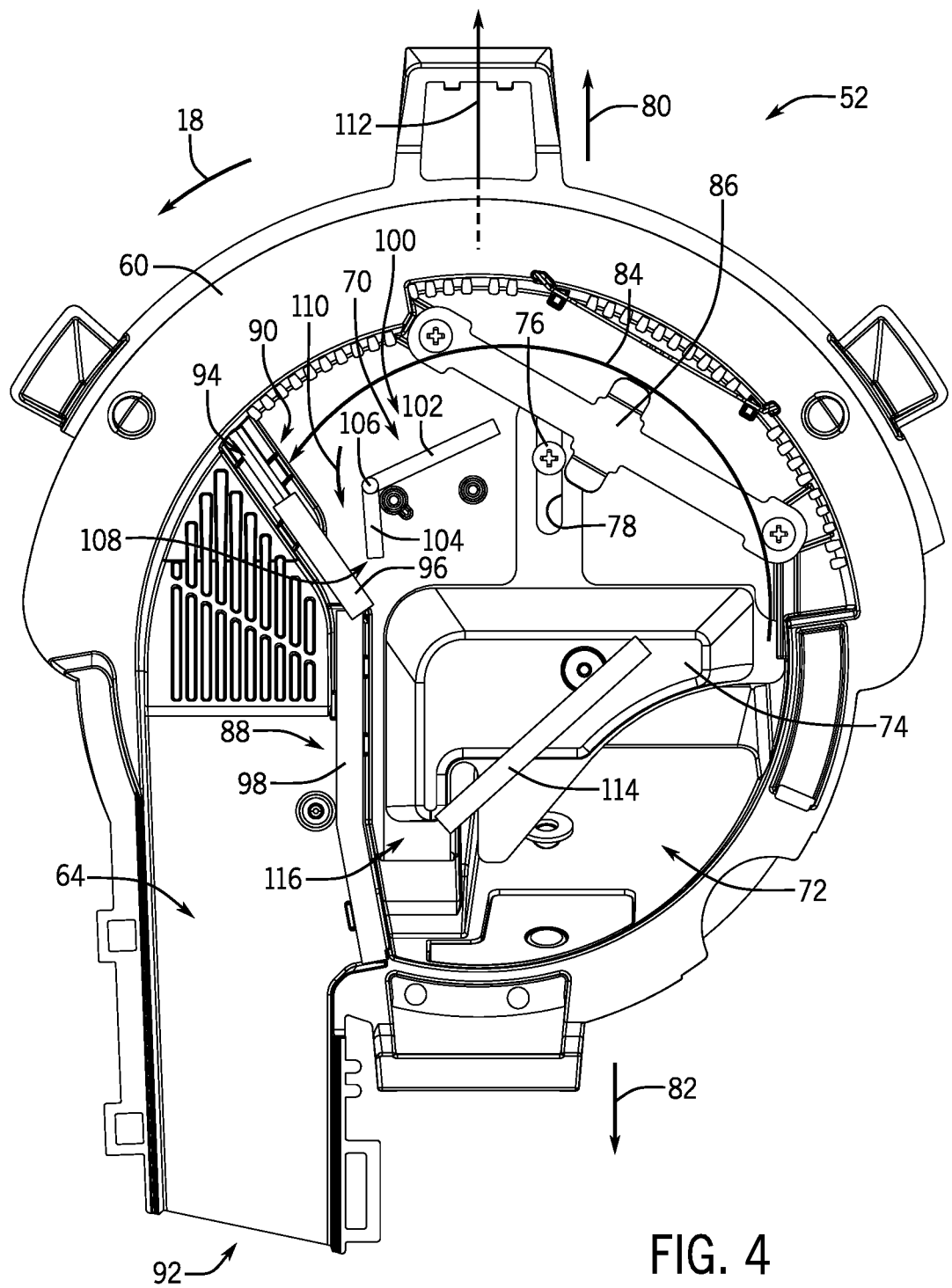
FIG. 4 is a front view of a portion of the agricultural product meter of FIG. 3, in which the agricultural product meter includes an embodiment of a product control assembly, and the agricultural product meter is in a working position.

FIG. 4 is a front view of a portion of the agricultural product meter 52 of FIG. 3, in which the agricultural product meter 52 includes an embodiment of a product control assembly 70, and the agricultural product meter 52 is in a working position. As illustrated, the agricultural product meter 52 includes an agricultural product storage area 72 fluidly coupled to the inlet. Accordingly, during operation of the agricultural product meter 52, the agricultural product flows through the inlet from the hopper to the agricultural product storage area. Furthermore, as previously discussed, the agricultural product meter 52 includes the movable baffle 74 configured to control flow of the agricultural product between the inlet and the agricultural product storage area 72. In the illustrated embodiment, the movable baffle 74 is movably coupled to the housing 60 by a fastener 76, and a slot 78 within the movable baffle 74 enables the movable baffle 74 to move in an upward direction 80 and a downward direction 82. The movable baffle 74 may be moved between multiple positions (e.g., via the pin, via manual movement of the movable baffle, etc.), thereby controlling the flow of the agricultural product between the inlet and the agricultural product storage area 72. For example, a position of the movable baffle 74 may be selected based on the type of agricultural product (e.g., seed, etc.) within the hopper. While the movable baffle 74 is movably coupled to the housing 60 by the fastener 76 in the illustrated embodiment, in other embodiments, the movable baffle may be movably coupled to the housing by other suitable type(s) of movable coupling assembly/assemblies (e.g., alone or in combination with the fastener/slot assembly), such as a track assembly, a rail assembly, other suitable type(s) of coupling assembly/assemblies, or a combination thereof. Furthermore, while the movable baffle is movably coupled to the housing in the illustrated embodiment, in other embodiments, a baffle may be non-movably coupled to the housing. In such embodiments, a particular baffle may be selected for the type of agricultural product within the hopper.

As previously discussed, rotation of the disc moves the agricultural product along a product path 84 from the agricultural product storage area 72 to the outlet 64. Once the agricultural product (e.g., seed, etc.) enters the outlet 64, the air pressure on each side of the disc is substantially equalized (e.g., at the end of a vacuum passage), thereby enabling the agricultural product (e.g., seed, etc.) to flow through the outlet 64 in the downward direction 82 to the agricultural product conveying system (e.g., seed tube or powered agricultural product conveyor). In certain embodiments, the agricultural product meter 52 includes a singulator configured to remove excess agricultural product from the disc before the agricultural product reaches the outlet 64. The singulator may include an engagement member coupled to the housing 60 via a bracket 86 and configured to remove any excess agricultural product from each opening of the disc. For example, each opening may be configured to move a single seed along the product path 84 from the agricultural product storage area 72 to the outlet 64. The singulator may be configured to remove any seeds in excess of one from each respective opening, thereby substantially establishing a target spacing between seeds within the soil. As discussed in detail below, the excess agricultural product (e.g., agricultural product removed by the singulator, agricultural product that becomes dislodged from the disc, etc.) may be directed to the agricultural product storage area 72. While a singulator is disclosed above, in certain embodiments, the singulator may be omitted. In such embodiments, excess agricultural product (e.g., which becomes dislodged from the disc) may flow from the product path to the agricultural product storage area.

The agricultural product meter 52 includes an outlet barrier 88 forming a portion of the outlet 64, which extends from an outlet entrance 90 to an outlet exit 92. In the illustrated embodiment, the outlet barrier 88 includes a recess 94 at the outlet entrance 90 configured to enable the agricultural product moving along the product path 84 to enter the outlet 64. However, in other embodiments, a gap may be formed between the outlet barrier and the agricultural product meter housing at the outlet entrance to enable the agricultural product moving along the product path to enter the outlet. In the illustrated embodiment, the outlet barrier 88 includes an angled portion 96 and a substantially vertical portion 98. However, in other embodiments, the outlet barrier may include more or fewer portions, and each portion may have any suitable shape (e.g., curved, straight, polygonal, etc.) and/or any suitable orientation within the agricultural product meter housing. Except for the recess 94, the outlet barrier 88 is configured to substantially block flow of agricultural product across the barrier, thereby substantially blocking flow of agricultural product into and out of the outlet 64.

In the illustrated embodiment, the agricultural product meter 52 includes a product control assembly 70 configured to substantially block flow of the agricultural product from the agricultural product meter 52 to the agricultural product conveying system while the agricultural product meter 52 is in the non-working position (e.g., headland position, transport position, etc.). The product control assembly 70 includes a first product control barrier 100 extending along the product path 84 (e.g., generally parallel to the product path 84, in the general direction of the product path 84, etc.) toward the outlet barrier 88 (e.g., toward the angled portion 96 of the outlet barrier 88). As illustrated, the first product control barrier 100 includes a first portion 102 and a second portion 104. The first portion 102 of the first product control barrier 100 is coupled (e.g., non-movably coupled) to the housing 60 of the agricultural product meter 52, and the second portion 104 of the first product control barrier 100 is pivotally coupled to the first portion 102 of the first product control barrier 100. The second portion may be directly pivotally coupled to the first portion (e.g., via a hinge as disclosed in detail below), or the second portion may be indirectly pivotally coupled to the first portion via another suitable element of the agricultural product meter. For example, in certain embodiments, the second portion of the first product control barrier may be pivotally coupled to the housing of the agricultural product meter, thereby indirectly pivotally coupling the second portion to the first portion, which is coupled (e.g., non-movably coupled) to the housing. Furthermore, the second portion 104 (e.g., base of the second portion) may engage the housing 60, or the second portion 104 (e.g., base of the second portion) may be spaced apart from the housing 60 by a distance less than a minimum expected dimension of each particle (e.g., seed) of the agricultural product.

In the illustrated embodiment, the second portion 104 is pivotally coupled to the first portion 102 by a mechanical hinge 106. However, in other embodiments, the first and second portions of the first product control barrier may be pivotally coupled by a living hinge. For example, the first product control barrier may be formed by a molding process (e.g., injection molding process, etc.) as a single element, and a third portion may be formed by the molding process between the first and second portions, in which the third portion is thinner than the first and second portions, thereby forming a living hinge between the first and second portions. In certain embodiments, the second portion may be pivotally cycled during the manufacturing process (e.g., after molding while the first product control barrier is still warm) to increase the flexibility and longevity of the living hinge, and/or a weight may be coupled to the second portion to urge the second portion downwardly. Pivotally coupling the first and second portions of the first product control barrier by a living hinge may reduce the cost of the product control assembly and/or substantially reduce accumulation of dirt/debris within the hinge.

As illustrated, the second portion 104 of the first product control barrier 100 is configured to be spaced apart from the outlet barrier 88 (e.g., the angled portion 96 of the outlet barrier 88) while the agricultural product meter 52 is in the illustrated working position, thereby enabling excess agricultural product to flow through a gap 108 between the second portion 104 and the outlet barrier 88 (e.g., the angled portion 96 of the outlet barrier 88) from the product path 84 to the agricultural product storage area 72. For example, the singulator may remove excess agricultural product from the disc before the agricultural product reaches the outlet 64. The excess agricultural product may flow along a path 110 from the product path 84 to the gap 108. The excess agricultural product may then flow through the gap 108 to the agricultural product storage area 72. In the illustrated embodiment, the first portion 102 of the first product control barrier 100 is angled downwardly toward the hinge, thereby directing the excess agricultural product toward the gap 108 while the agricultural product meter 52 is in the illustrated working position. However, in other embodiments, the first portion of the first product control barrier may be angled upwardly toward the hinge, thereby directing the excess agricultural product toward a second product control barrier while the agricultural product meter is in the working position. The first portion 102 of the first product control barrier 100 may be oriented at any suitable angle relative to a vertical axis 112 of the agricultural product meter 52 (e.g., about 90 degrees, about 85 degrees, about 80 degrees, about 75 degrees, about 70 degrees, about 65 degrees, about 60 degrees, about 55 degrees, about 50 degrees, about 45 degrees, about 40 degrees, about 35 degrees, about 30 degrees, about 20 degrees, about 10 degrees, etc.). In certain embodiments, the vertical axis 112 is fixed to the agricultural product meter and extends along a direction of gravitational acceleration while the agricultural product meter is in the working position.

While the agricultural product meter 52 is in the working position, the force of gravity on the second portion 104 of the first product control barrier 100 drives the second portion 104 to rotate to the illustrated position, thereby establishing the gap 108 between the second portion 104 and the outlet barrier 88. For example, while the agricultural product meter 52 is in the working position, the second portion 104 of the first product control barrier 100 may be substantially aligned with the vertical axis 112 of the agricultural product meter 52. However, as the agricultural product meter 52 rotates in the forward direction 18 toward the non-working position, the force of gravity drives the second portion 104 (e.g., a distal end of the second portion) toward the outlet barrier 88. Accordingly, the second portion 104 of the first product control barrier 100 (e.g., a distal end of the second portion) is configured to contact the outlet barrier 88 (e.g., the angled portion 96 of the outlet barrier 88) while the agricultural product meter 52 is in the non-working position, thereby substantially blocking flow of the agricultural product from the agricultural product storage area 72 into the outlet 64 (e.g., into the entrance 90 of the outlet 64).

In the illustrated embodiment, the product control assembly 70 includes a second product control barrier 114 that forms an end (e.g., upper end) of the agricultural product storage area 72. As illustrated, the second product control barrier 114 is spaced apart from the outlet barrier 88 (e.g., the substantially vertical portion 98 of the outlet barrier 88), thereby establishing a second gap 116. The second gap 116 enables the excess agricultural product to flow into the agricultural product storage area 72. For example, the excess agricultural product may flow along the path 110 from the product path 84 to the first gap 108, through the first gap 108 and the second gap 116, and into the agricultural product storage area 72. Furthermore, as discussed in detail below, the first and second product control barriers are configured to cooperate to substantially block flow of the agricultural product from the agricultural product storage area 72 into the outlet 64 (e.g., into the outlet entrance 90) while the agricultural product meter 52 is in the non-working position.

In the illustrated embodiment, the second product control barrier 114 is angled downwardly toward the second gap 116 relative to the vertical axis 112 of the agricultural product meter 52, thereby directing the excess agricultural product toward the second gap 116 while the agricultural product meter 52 is in the illustrated working position. The second product control barrier 114 may be oriented at any suitable angle relative to the vertical axis 112 (e.g., about 90 degrees, about 85 degrees, about 80 degrees, about 75 degrees, about 70 degrees, about 65 degrees, about 60 degrees, about 55 degrees, about 50 degrees, about 45 degrees, about 40 degrees, about 35 degrees, about 30 degrees, about 20 degrees, about 10 degrees, etc.). Furthermore, in the illustrated embodiment, the second product control barrier 114 is coupled to the movable baffle 74. Accordingly, the second product control barrier 114 is movably coupled to the housing 60 and configured to move with the movable baffle 74 between the selected positions. As previously discussed, in certain embodiments, the agricultural product meter may include a non-movable and interchangeable baffle. In such embodiments, the second product control barrier may be coupled to the non-movable and interchangeable baffle. Furthermore, in certain embodiments, the second product control barrier may be coupled to another suitable element of the agricultural product meter, such as the housing. In addition, in certain embodiments, the first portion of the first product control barrier may be coupled to the baffle (e.g., movable baffle) or another suitable element of the agricultural product meter, thereby indirectly coupling the first portion of the first product control barrier to the agricultural product meter housing.

Each barrier is configured to substantially block flow of the agricultural product across the barrier (e.g., with the exception of the recess in the outlet barrier). In certain embodiments, at least one barrier may include a brush having a distal end configured to be positioned proximate to the disc, such that the brush is spaced apart from the disc by a distance less than a minimum expected dimension of each particle (e.g., seed) of the agricultural product. The brush may extend along a portion of the height of the respective barrier (e.g., extent of the barrier between the housing and the disc) or along the entire height of the respective barrier. The brush may substantially block agricultural product flow across the barrier without substantially interfering with rotation of the disc. Furthermore, in certain embodiments, at least one barrier may include a rigid element spaced apart from the disc by a distance less than a minimum expected dimension of each particle (e.g., seed) of the agricultural product. As a result, the barrier may substantially block flow of the agricultural product across the barrier without interfering with rotation of the disc. In addition, in certain embodiments, at least one barrier may include a bearing surface (e.g., formed from a polymeric material, such as polytetrafluoroethylene) configured to contact the disc and to reduce friction between the barrier and the disc. Accordingly, the barrier may substantially block flow of the agricultural product across the barrier without substantially interfering with rotation of the disc.

Figure 5:
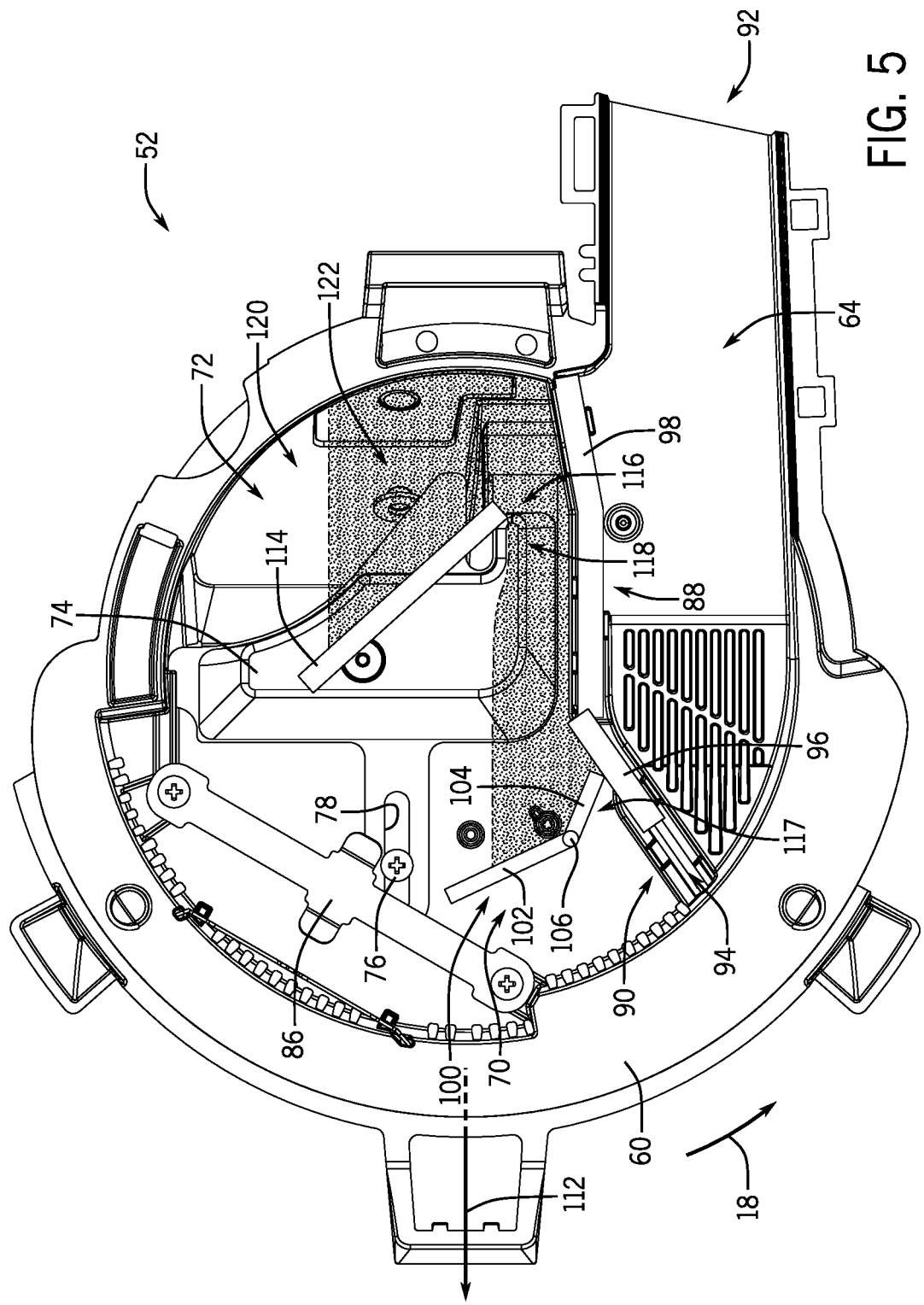
FIG. 5 is a front view of a portion of the agricultural product meter of FIG. 3, in which the agricultural product meter includes the product control assembly of FIG. 4, and the agricultural product meter is in a non-working position.

FIG. 5 is a front view of a portion of the agricultural product meter 52 of FIG. 3, in which the agricultural product meter 52 includes the product control assembly 70 of FIG. 4, and the agricultural product meter 52 is in the non-working position (e.g., headland position, transport position, etc.). In the illustrated embodiment, the first and second product control barriers overlap along the vertical axis 112 of the agricultural product meter 52 (e.g., a line extending parallel to the vertical axis 112 intersects the first product control barrier 100 and the second product control barrier 114). In addition, with the agricultural product meter 52 in the illustrated non-working position (e.g., in which the agricultural product meter 52 is oriented at an angle that enables a first portion 118 of the agricultural product 120 to engage the first product control barrier 100), the second portion 104 of the first product control barrier 100 (e.g., a distal end of the second portion 104) contacts the outlet barrier 88 (e.g., the angled portion 96 of the outlet barrier 88). In the illustrated embodiment, the second portion 104 of the first product control barrier 100 is shaped to substantially fill a space 117 between the first portion 102 of the first product control barrier 100 and the outlet barrier 88 (e.g., such that any unblocked portion of the space 117 has a maximum dimension less than a minimum expected dimension of each particle of the agricultural product). As a result, while the second portion 104 of the first product control barrier 100 is in contact with the outlet barrier 88, the first portion 118 of the agricultural product 120 is substantially blocked from flowing from the agricultural product storage area 72 into the outlet 64 (e.g., into the entrance 90 of the outlet 64). Furthermore, the second product control barrier 114 substantially blocks a second portion 122 of the agricultural product 120 from flowing from the agricultural product storage area 72 into the outlet 64 (e.g., into the entrance 90 of the outlet 64). Accordingly, the first and second product control barriers cooperate to substantially block flow of the agricultural product from the agricultural product storage area 72 into the outlet 64 while the agricultural product meter 52 is in the illustrated non-working position.

In the illustrated embodiment, the agricultural product meter 52 is rotated about 90 degrees in the forward direction 18 from the working position, as shown in FIG. 4, to the illustrated non-working position. However, in other embodiments, the agricultural product meter may be rotated greater than 90 degrees or less than 90 degrees in the forward direction from the working position to the non-working position. In certain embodiments, the agricultural product meter may be rotated about 45 degrees, about 60 degrees, about 70 degrees, about 80 degrees, about 90 degrees, about 100 degrees, about 110 degrees, or about 120 degrees in the forward direction from the working position to the non-working position. For example, in certain embodiments, the agricultural product meter may be rotated about 55 degrees to about 65 degrees in the forward direction from the working position to the headland position, and/or the agricultural product meter may be rotated about 80 degrees to about 110 degrees (e.g., about 82 degrees, about 97 degrees, etc.) in the forward direction from the working position to the transport position. While the product control assembly 70 includes two product control barriers in the illustrated embodiment, in other embodiments, the second product control barrier may be omitted. In such embodiments (e.g., embodiments in which the singulator is omitted), the first portion of the first product control barrier may be extended away from the second portion of the first product control barrier, thereby enabling the first product control barrier to substantially block flow of the agricultural product from the agricultural product storage area into the outlet while the agricultural product meter is in the non-working position.

Figure 6:
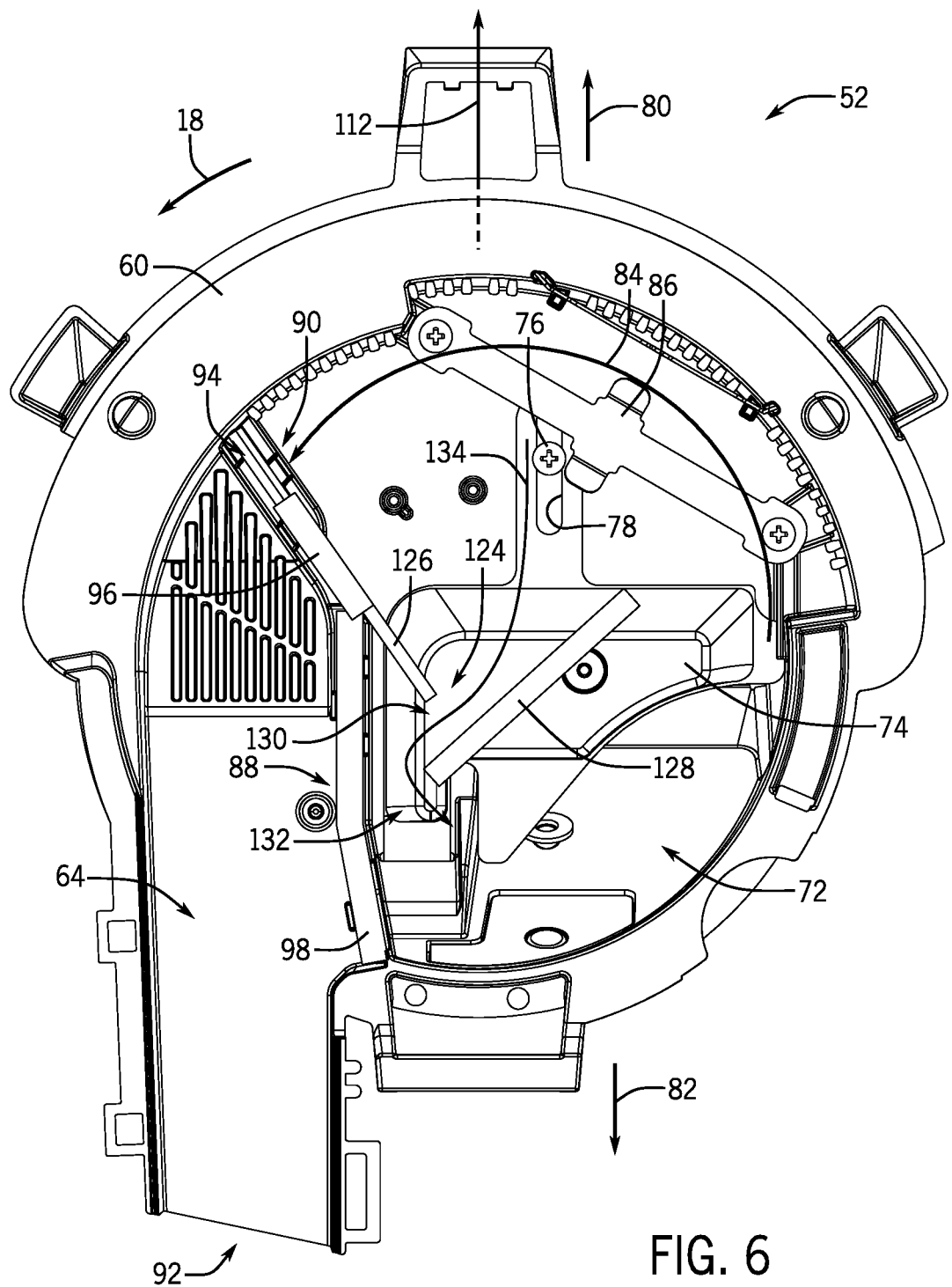
FIG. 6 is a front view of a portion of the agricultural product meter of FIG. 3, in which the agricultural product meter includes another embodiment of a product control assembly, and the agricultural product meter is in the working position.

FIG. 6 is a front view of a portion of the agricultural product meter 52 of FIG. 3, in which the agricultural product meter 52 includes another embodiment of a product control assembly 124, and the agricultural product meter 52 is in the working position. The product control assembly 124 is configured to substantially block flow of the agricultural product from the agricultural product meter 52 to the agricultural product conveying system while the agricultural product meter 52 is in the non-working position (e.g., headland position, transport position, etc.). The product control assembly 124 includes a first product control barrier 126 extending from the outlet barrier 88 toward the agricultural product storage area 72. In the illustrated embodiment, the first product control barrier 126 extends from the intersection of the angled portion 96 and the substantially vertical portion 98 of the outlet barrier 88. However, in other embodiments, the first product control barrier may extend from any suitable location along the outlet barrier. As used herein with regard to the illustrated embodiment, "extending from"/"extends from" refers to direct contact between the first product control barrier 126 and the outlet barrier 88, or a separation distance between the first product control barrier 126 and the outlet barrier 88 of less than an expected minimum dimension of each particle (e.g., seed) of the agricultural product. The first product control barrier 126 may be oriented at any suitable angle relative to the vertical axis 112 (e.g., about 90 degrees, about 85 degrees, about 80 degrees, about 75 degrees, about 70 degrees, about 65 degrees, about 60 degrees, about 55 degrees, about 50 degrees, about 45 degrees, about 40 degrees, about 35 degrees, about 30 degrees, about 20 degrees, about 10 degrees, etc.).

In the illustrated embodiment, the product control assembly 124 includes a second product control barrier 128 that forms an end (e.g., upper end) of the agricultural product storage area 72. As illustrated, the first product control barrier is spaced apart from the second product control barrier to establish a gap 130. The gap 130 enables the excess agricultural product to flow from the product path 84 to the agricultural product storage area 72. In addition, the second product control barrier 128 is spaced apart from the outlet barrier 88 (e.g., the substantially vertical portion 98 of the outlet barrier 88), thereby establishing a second gap 132. The second gap 132 enables the excess agricultural product to flow into the agricultural product storage area 72. For example, the singulator may remove excess agricultural product from the disc before the agricultural product reaches the outlet 64. The excess agricultural product may flow along a path 134 from the product path 84 to the first gap 130, through the first gap 130 and the second gap 132, and into the agricultural product storage area 72. Furthermore, as discussed in detail below, the first and second product control barriers are configured to cooperate to substantially block flow of the agricultural product from the agricultural product storage area 72 into the outlet 64 (e.g., into the outlet entrance 90) while the agricultural product meter 52 is in the non-working position (e.g., headland position, transport position, etc.). For example, the length of the first product control barrier 126 may be particularly selected such that the gap 130, while the movable baffle 74 is in any selectable position, enables the excess agricultural product to flow into the agricultural product storage area 72 while the agricultural product meter 52 is in the working position, and enables the first and second product control barriers to substantially block flow of the agricultural product from the agricultural product storage area 72 into the outlet 64 while the agricultural product meter 52 is in the non-working position.

In the illustrated embodiment, the second product control barrier 128 is angled downwardly toward the second gap 132 relative to the vertical axis 112 of the agricultural product meter 52, thereby directing the excess agricultural product toward the second gap 132 while the agricultural product meter 52 is in the illustrated working position. The second product control barrier 128 may be oriented at any suitable angle relative to the vertical axis 112 (e.g., about 90 degrees, about 85 degrees, about 80 degrees, about 75 degrees, about 70 degrees, about 65 degrees, about 60 degrees, about 55 degrees, about 50 degrees, about 45 degrees, about 40 degrees, about 35 degrees, about 30 degrees, about 20 degrees, about 10 degrees, etc.). Furthermore, in the illustrated embodiment, the second product control barrier 128 is coupled to the movable baffle 74. Accordingly, the second product control barrier 128 is movably coupled to the housing 60 and configured to move with the movable baffle 74 between the selected positions. As previously discussed, in certain embodiments, the agricultural product meter may include a non-movable and interchangeable baffle. In such embodiments, the second product control barrier may be coupled to the non-movable and interchangeable baffle. Furthermore, in certain embodiments, the second product control barrier may be coupled to another suitable element of the agricultural product meter, such as the housing. In addition, in certain embodiments, the first product control barrier may be coupled to the baffle (e.g., movable baffle) or another suitable element of the agricultural product meter, thereby indirectly coupling the first product control barrier to the agricultural product meter housing.

As previously discussed, each barrier is configured to substantially block flow of the agricultural product across the barrier (e.g., with the exception of the recess in the outlet barrier). In certain embodiments, at least one barrier may include a brush having a distal end configured to be positioned proximate to the disc, such that the brush is spaced apart from the disc by a distance less than a minimum expected dimension of each particle (e.g., seed) of the agricultural product. The brush may extend along a portion of the height of the respective barrier (e.g., extent of the barrier between the housing and the disc) or along the entire height of the respective barrier. The brush may substantially block agricultural product flow across the barrier without substantially interfering with rotation of the disc. Furthermore, in certain embodiments, at least one barrier may include a rigid element spaced apart from the disc by a distance less than a minimum expected dimension of each particle (e.g., seed) of the agricultural product. As a result, the barrier may substantially block flow of the agricultural product across the barrier without interfering with rotation of the disc. In addition, in certain embodiments, at least one barrier may include a bearing surface (e.g., formed from a polymeric material, such as polytetrafluoroethylene) configured to contact the disc and to reduce friction between the barrier and the disc. Accordingly, the barrier may substantially block flow of the agricultural product across the barrier without substantially interfering with rotation of the disc.

Figure 7:
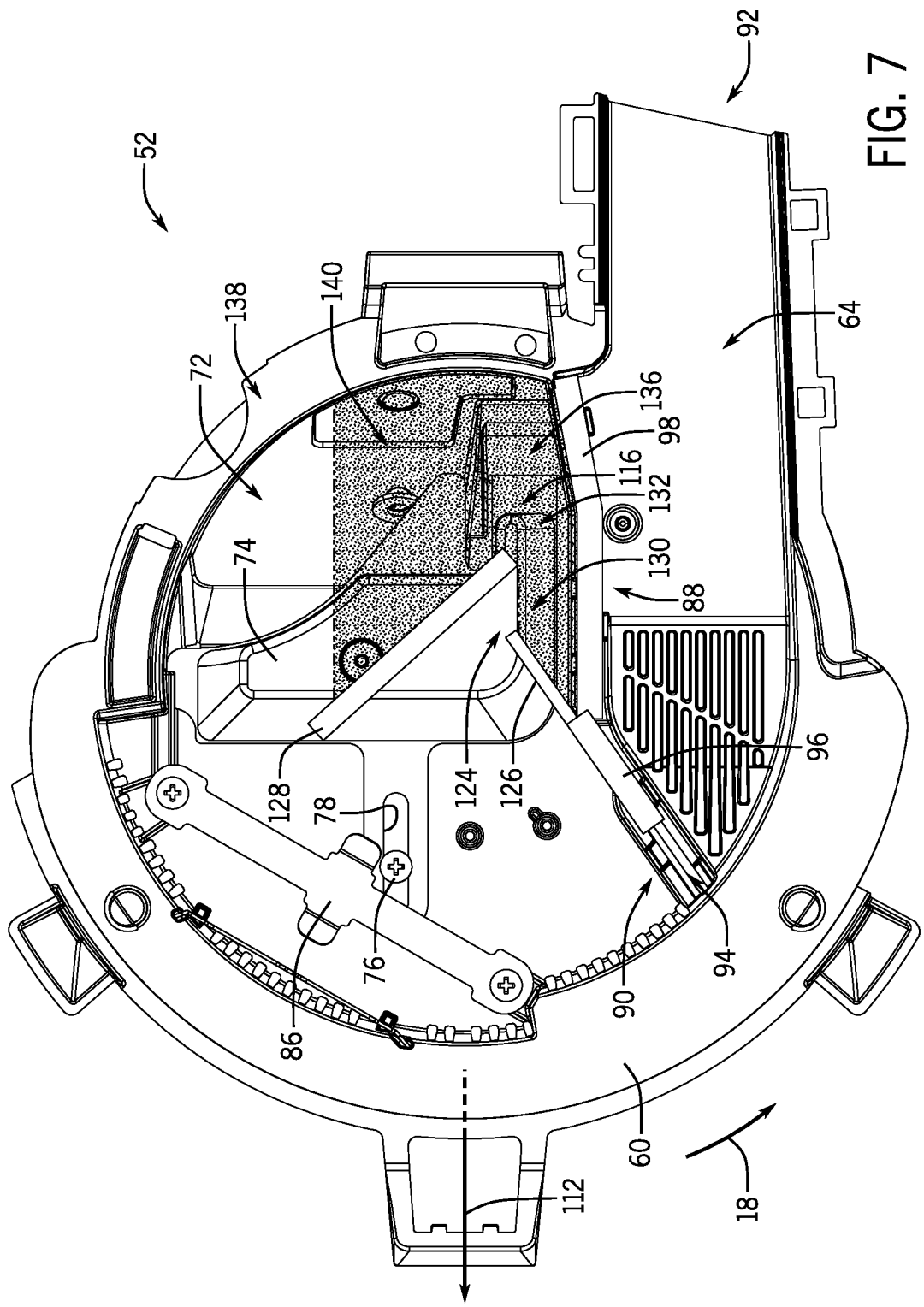
FIG. 7 is a front view of a portion of the agricultural product meter of FIG. 3, in which the agricultural product meter includes the product control assembly of FIG. 6, and the agricultural product meter is in the non-working position.

FIG. 7 is a front view of a portion of the agricultural product meter 52 of FIG. 3, in which the agricultural product meter 52 includes the product control assembly 124 of FIG.

6, and the agricultural product meter 52 is in the non-working position (e.g., headland position, transport position, etc.). In the illustrated embodiment, the first and second product control barriers overlap along the vertical axis 112 of the agricultural product meter 52 (e.g., a line extending parallel to the vertical axis 112 intersects the first product control barrier 126 and the second product control barrier 128). In addition, with the agricultural product meter 52 in the illustrated non-working position (e.g., in which the agricultural product meter 52 is oriented at an angle that enables a first portion 136 of the agricultural product 138 to engage the first product control barrier 126), the first product control barrier 126 substantially blocks the first portion 136 of the agricultural product 138 from flowing from the agricultural product storage area 72 into the outlet 64 (e.g., into the entrance 90 of the outlet 64). Furthermore, the second product control barrier 128 substantially blocks a second portion 140 of the agricultural product 138 from flowing from the agricultural product storage area 72 into the outlet 64 (e.g., into the entrance 90 of the outlet 64). Accordingly, the first and second product control barriers cooperate to substantially block flow of the agricultural product from the agricultural product storage area 72 into the outlet 64 while the agricultural product meter 52 is in the illustrated non-working position.

In the illustrated embodiment, the agricultural product meter 52 is rotated about 90 degrees in the forward direction 18 from the working position, as shown in FIG. 6, to the illustrated non-working position. However, in other embodiments, the agricultural product meter may be rotated greater than 90 degrees or less than 90 degrees in the forward direction from the working position to the non-working position. In certain embodiments, the agricultural product meter may be rotated about 45 degrees, about 60 degrees, about 70 degrees, about 80 degrees, about 90 degrees, about 100 degrees, about 110 degrees, or about 120 degrees in the forward direction from the working position to the non-working position. For example, in certain embodiments, the agricultural product meter may be rotated about 55 degrees to about 65 degrees in the forward direction from the working position to the headland position, and/or the agricultural product meter may be rotated about 80 degrees to about 110 degrees (e.g., about 82 degrees, about 97 degrees, etc.) in the forward direction from the working position to the transport position.

Figure 8:
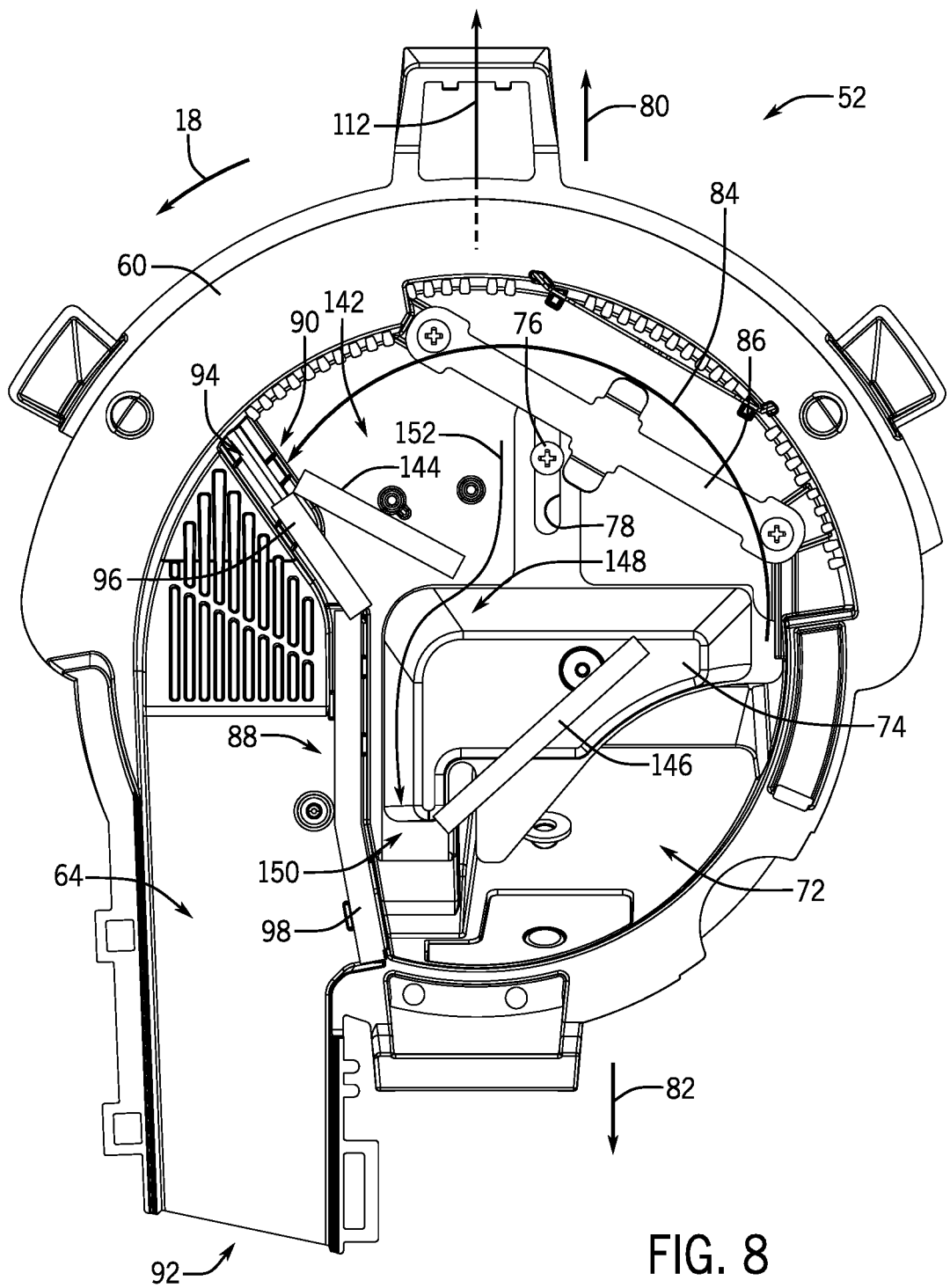
FIG. 8 is a front view of a portion of the agricultural product meter of FIG. 3, in which the agricultural product meter includes a further embodiment of a product control assembly, and the agricultural product meter is in the working position.

FIG. 8 is a front view of a portion of the agricultural product meter 52 of FIG. 3, in which the agricultural product meter 52 includes a further embodiment of a product control assembly 142, and the agricultural product meter 52 is in the working position. The product control assembly 142 is configured to substantially block flow of the agricultural product from the agricultural product meter 52 to the agricultural product conveying system while the agricultural product meter 52 is in the non-working position (e.g., headland position, transport position, etc.). The product control assembly 142 includes a first product control barrier 144 extending from the outlet barrier 88 toward the agricultural product storage area 72 (e.g., toward a center of the agricultural product meter and/or a pivot axis of the disc). In the illustrated embodiment, the first product control barrier 144 extends from the angled portion 96 of the outlet barrier 88. However, in other embodiments, the first product control barrier may extend from any suitable location along the outlet barrier. As used herein with regard to the illustrated embodiment, "extending from"/"extends from" refers to direct contact between the first product control barrier 144 and the outlet barrier 88, or a separation distance between the first product control barrier 144 and the outlet barrier 88 of less than an expected minimum dimension of each particle (e.g., seed) of the agricultural product. The first product control barrier 144 may be oriented at any suitable angle relative to the vertical axis 112 (e.g., about 90 degrees, about 85 degrees, about 80 degrees, about 75 degrees, about 70 degrees, about 65 degrees, about 60 degrees, about 55 degrees, about 50 degrees, about 45 degrees, about 40 degrees, about 35 degrees, about 30 degrees, about 20 degrees, about 10 degrees, etc.).

In the illustrated embodiment, the product control assembly 142 includes a second product control barrier 146 that forms an end (e.g., upper end) of the agricultural product storage area 72. As illustrated, the first product control barrier is spaced apart from the second product control barrier to establish a gap 148. The gap 148 enables the excess agricultural product to flow from the product path 84 to the agricultural product storage area 72. In addition, the second product control barrier 146 is spaced apart from the outlet barrier 88 (e.g., the substantially vertical portion 98 of the outlet barrier 88), thereby establishing a second gap 150. The second gap 150 enables the excess agricultural product to flow into the agricultural product storage area 72. For example, the singulator may remove excess agricultural product from the disc before the agricultural product reaches the outlet 64. The excess agricultural product may flow along a path 152 from the product path 84 to the first gap 148, through the first gap 148 and the second gap 150, and into the agricultural product storage area 72. Furthermore, as discussed in detail below, the first and second product control barriers are configured to cooperate to substantially block flow of the agricultural product from the agricultural product storage area 72 into the outlet 64 (e.g., into the outlet entrance 90) while the agricultural product meter 52 is in the non-working position (e.g., headland position, transport position, etc.).

In the illustrated embodiment, the second product control barrier 146 is angled downwardly toward the second gap 150 relative to the vertical axis 112 of the agricultural product meter 52, thereby directing the excess agricultural product toward the second gap 150 while the agricultural product meter 52 is in the illustrated working position. The second product control barrier 146 may be oriented at any suitable angle relative to the vertical axis 112 (e.g., about 90 degrees, about 85 degrees, about 80 degrees, about 75 degrees, about 70 degrees, about 65 degrees, about 60 degrees, about 55 degrees, about 50 degrees, about 45 degrees, about 40 degrees, about 35 degrees, about 30 degrees, about 20 degrees, about 10 degrees, etc.). Furthermore, in the illustrated embodiment, the second product control barrier 146 is coupled to the movable baffle 74. Accordingly, the second product control barrier 146 is movably coupled to the housing 60 and configured to move with the movable baffle 74 between the selected positions. As previously discussed, in certain embodiments, the agricultural product meter may include a non-movable and interchangeable baffle. In such embodiments, the second product control barrier may be coupled to the non-movable and interchangeable baffle. Furthermore, in certain embodiments, the second product control barrier may be coupled to another suitable element of the agricultural product meter, such as the housing. In addition, in certain embodiments, the first product control barrier may be coupled to the baffle (e.g., movable baffle) or another suitable element of the agricultural product meter, thereby indirectly coupling the first product control barrier to the agricultural product meter housing.

As previously discussed, each barrier is configured to substantially block flow of the agricultural product across the barrier (e.g., with the exception of the recess in the outlet barrier). In certain embodiments, at least one barrier may include a brush having a distal end configured to be positioned proximate to the disc, such that the brush is spaced apart from the disc by a distance less than a minimum expected dimension of each particle (e.g., seed) of the agricultural product. The brush may extend along a portion of the height of the respective barrier (e.g., extent of the barrier between the housing and the disc) or along the entire height of the respective barrier. The brush may substantially block agricultural product flow across the barrier without substantially interfering with rotation of the disc. Furthermore, in certain embodiments, at least one barrier may include a rigid element spaced apart from the disc by a distance less than a minimum expected dimension of each particle (e.g., seed) of the agricultural product. As a result, the barrier may substantially block flow of the agricultural product across the barrier without interfering with rotation of the disc. In addition, in certain embodiments, at least one barrier may include a bearing surface (e.g., formed from a polymeric material, such as polytetrafluoroethylene) configured to contact the disc and to reduce friction between the barrier and the disc. Accordingly, the barrier may substantially block flow of the agricultural product across the barrier without substantially interfering with rotation of the disc.

Figure 9:
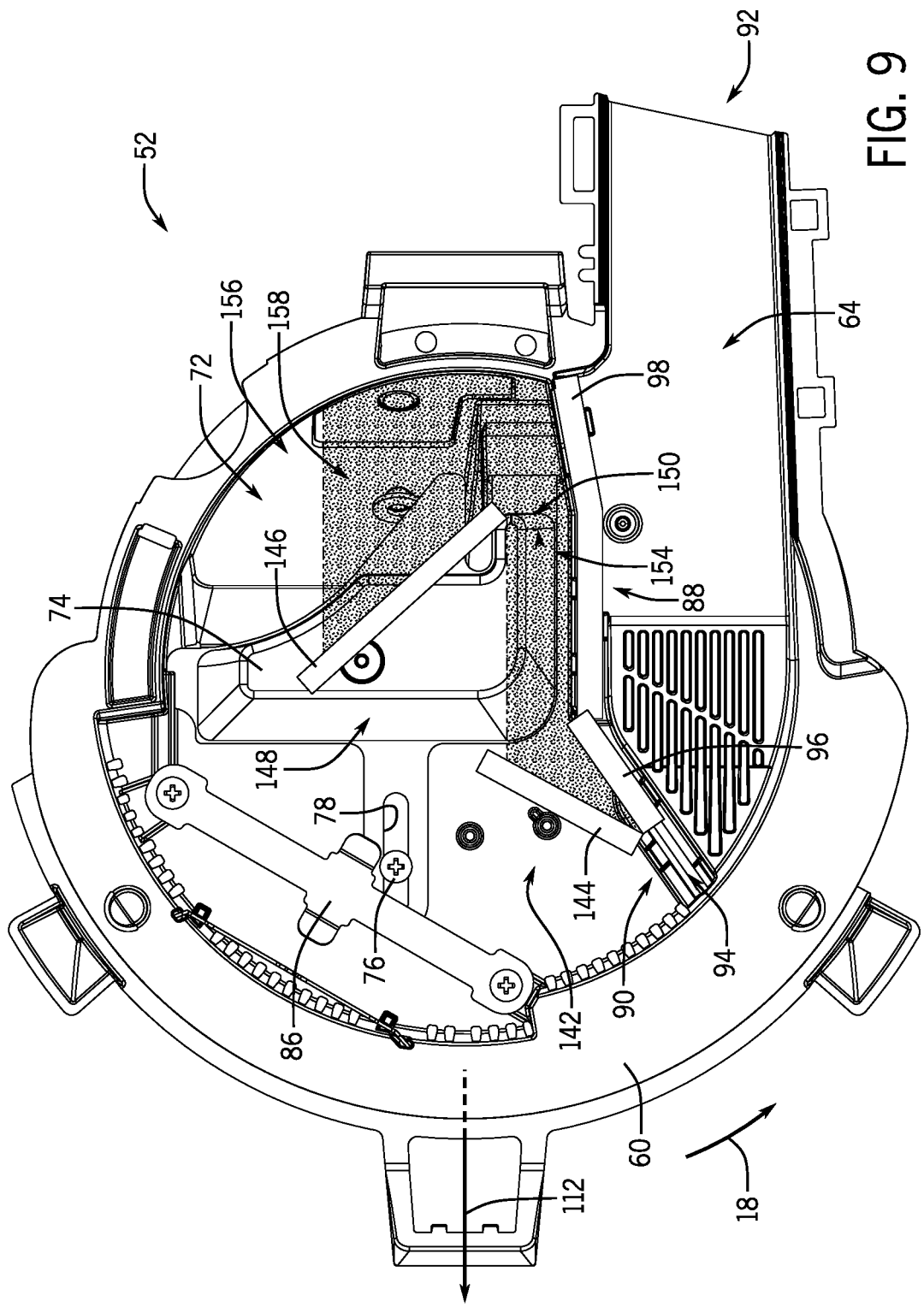
FIG. 9 is a front view of a portion of the agricultural product meter of FIG. 3, in which the agricultural product meter includes the product control assembly of FIG. 8, and the agricultural product meter is in the non-working position.

FIG. 9 is a front view of a portion of the agricultural product meter 52 of FIG. 3, in which the agricultural product meter 52 includes the product control assembly 142 of FIG. 8, and the agricultural product meter 52 is in the non-working position (e.g., headland position, transport position, etc.). In the illustrated embodiment, the first and second product control barriers overlap along the vertical axis 112 of the agricultural product meter 52 (e.g., a line extending parallel to the vertical axis 112 intersects the first product control barrier 144 and the second product control barrier 146). In addition, with the agricultural product meter 52 in the illustrated non-working position (e.g., in which the agricultural product meter 52 is oriented at an angle that enables a first portion 154 of the agricultural product 156 to engage the first product control barrier 144), the first product control barrier 144 substantially blocks the first portion 154 of the agricultural product 156 from flowing from the agricultural product storage area 72 into the outlet 64 (e.g., into the entrance 90 of the outlet 64). Furthermore, the second product control barrier 146 substantially blocks a second portion 158 of the agricultural product 156 from flowing from the agricultural product storage area 72 into the outlet 64 (e.g., into the entrance 90 of the outlet 64). Accordingly, the first and second product control barriers cooperate to substantially block flow of the agricultural product from the agricultural product storage area 72 into the outlet 64 while the agricultural product meter 52 is in the illustrated non-working position.

In the illustrated embodiment, the agricultural product meter 52 is rotated about 90 degrees in the forward direction 18 from the working position, as shown in FIG. 8, to the illustrated non-working position. However, in other embodiments, the agricultural product meter may be rotated greater than 90 degrees or less than 90 degrees in the forward direction from the working position to the non-working position. In certain embodiments, the agricultural product meter may be rotated about 45 degrees, about 60 degrees, about 70 degrees, about 80 degrees, about 90 degrees, about 100 degrees, about 110 degrees, or about 120 degrees in the forward direction from the working position to the non-working position. For example, in certain embodiments, the agricultural product meter may be rotated about 55 degrees to about 65 degrees in the forward direction from the working position to the headland position, and/or the agricultural product meter may be rotated about 80 degrees to about 110 degrees (e.g., about 82 degrees, about 97 degrees, etc.) in the forward direction from the working position to the transport position.

In certain embodiments, at least one of the product control assemblies disclosed above with reference to FIGS. 4-9 may be sold as a kit (e.g., retrofit kit) having the first product control barrier, the second product control barrier, and, in certain embodiments, other components of the agricultural product meter (e.g., the movable baffle, etc.). In such embodiments, the kit may include a coupling system (e.g., including, adhesive, fastener(s), magnet(s), alignment pin(s), etc.) configured to couple each product control barrier to the housing of the agricultural product meter. In other embodiments, the product control barriers of the product control assembly may be coupled to the housing of the agricultural product meter during the agricultural product meter manufacturing process.

Figure 10:
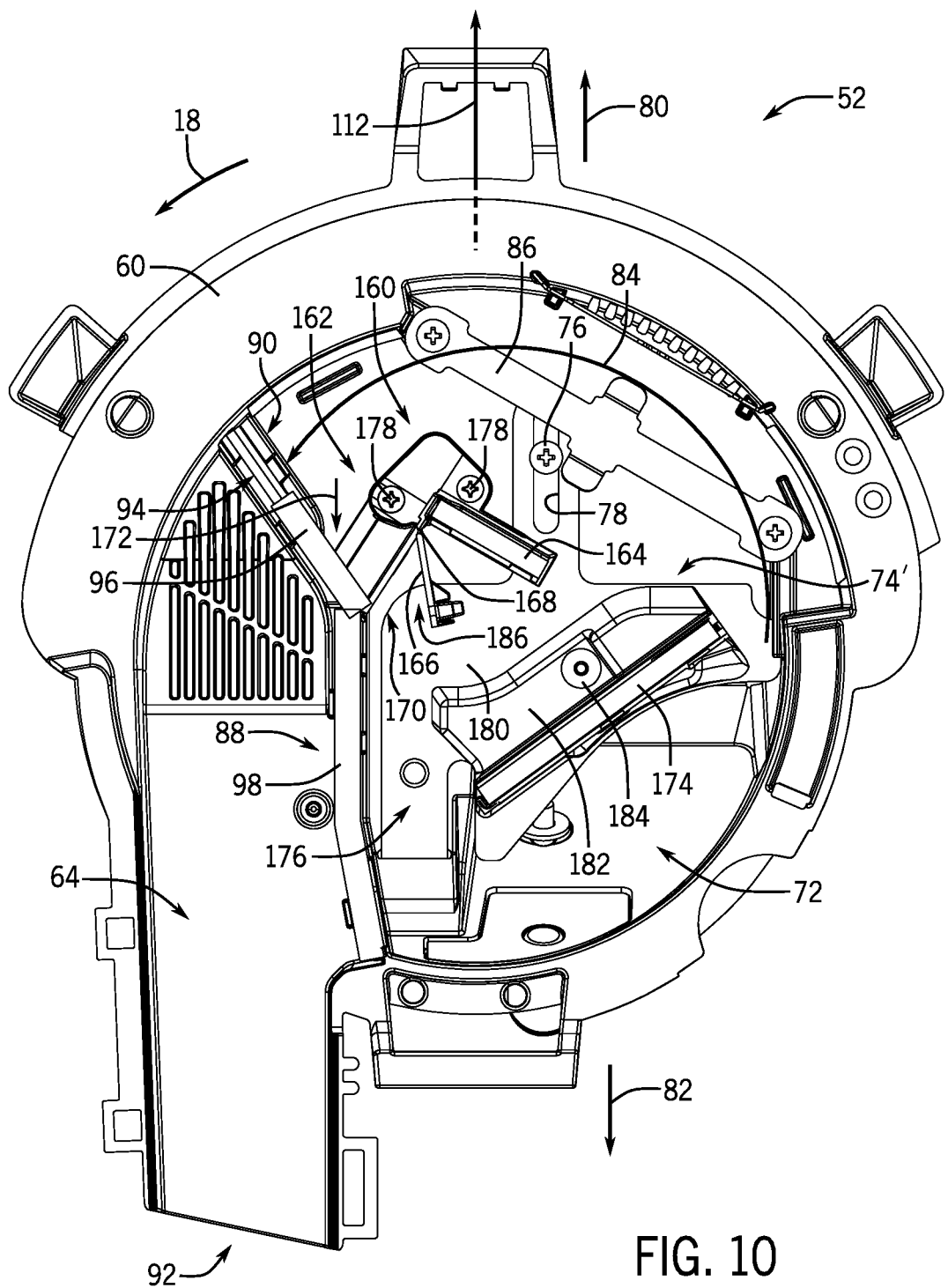
FIG. 10 is a front view of a portion of the agricultural product meter of FIG. 3, in which the agricultural product meter includes another embodiment of a product control assembly, and the agricultural product meter is in the working position.

FIG. 10 is a front view of a portion of the agricultural product meter 52 of FIG. 3, in which the agricultural product meter 52 includes another embodiment of a product control assembly 160, and the agricultural product meter 52 is in the working position. The product control assembly 160 is configured to substantially block flow of the agricultural product from the agricultural product meter 52 to the agricultural product conveying system while the agricultural product meter 52 is in the non-working position (e.g., headland position, transport position, etc.). The product control assembly 160 includes a first product control barrier 162 extending along the product path 84 (e.g., generally parallel to the product path 84, in the general direction of the product path 84, etc.) toward the outlet barrier 88 (e.g., toward the angled portion 96 of the outlet barrier 88). As illustrated, the first product control barrier 162 includes a first portion 164 and a second portion 166. The first portion 164 of the first product control barrier 162 is coupled (e.g., non-movably coupled) to the housing 60 of the agricultural product meter 52, and the second portion 166 of the first product control barrier 162 is pivotally coupled to the first portion 164 of the first product control barrier 162. The second portion may be directly pivotally coupled to the first portion (e.g., via a hinge as disclosed in detail below), or the second portion may be indirectly pivotally coupled to the first portion via another suitable element of the agricultural product meter. For example, in certain embodiments, the second portion of the first product control barrier may be pivotally coupled to the housing of the agricultural product meter, thereby indirectly pivotally coupling the second portion to the first portion, which is coupled (e.g., non-movably coupled) to the housing. Furthermore, the second portion 166 (e.g., base of the second portion) may engage the housing 60, or the second portion 166 (e.g., base of the second portion) may be spaced apart from the housing 60 by a distance less than a minimum expected dimension of each particle (e.g., seed) of the agricultural product.

In the illustrated embodiment, the second portion 166 is pivotally coupled to the first portion 164 by a living hinge 168. Pivotally coupling the first and second portions of the first product control barrier by a living hinge may reduce the cost of the product control assembly and/or substantially reduce accumulation of dirt/debris within the hinge (e.g., as compared to a mechanical hinge). While the second portion of the first product control barrier is pivotally coupled to the first portion of the first product control barrier by a living hinge in the illustrated embodiment, in other embodiments, the first and second portions of the first product control barrier may be pivotally coupled by a mechanical hinge.

As illustrated, the second portion 166 of the first product control barrier 162 is configured to be spaced apart from the outlet barrier 88 (e.g., the angled portion 96 of the outlet barrier 88) while the agricultural product meter 52 is in the illustrated working position, thereby enabling excess agricultural product to flow through a gap 170 between the second portion 166 and the outlet barrier 88 (e.g., the angled portion 96 of the outlet barrier 88) from the product path 84 to the agricultural product storage area 72. For example, the singulator may remove excess agricultural product from the disc before the agricultural product reaches the outlet 64. The excess agricultural product may flow along a path 172 from the product path 84 to the gap 170. The excess agricultural product may then flow through the gap 170 to the agricultural product storage area 72. In the illustrated embodiment, the first portion 164 of the first product control barrier 162 is angled upwardly toward the hinge, thereby directing the excess agricultural product toward a second product control barrier while the agricultural product meter is in the working position. However, in other embodiments, the first portion of the first product control barrier may be angled downwardly toward the hinge, thereby directing the excess agricultural product toward the gap while the agricultural product meter is in the illustrated working position. The first portion 164 of the first product control barrier 162 may be oriented at any suitable angle relative to the vertical axis 112 of the agricultural product meter 52 (e.g., about 90 degrees, about 85 degrees, about 80 degrees, about 75 degrees, about 70 degrees, about 65 degrees, about 60 degrees, about 55 degrees, about 50 degrees, about 45 degrees, about 40 degrees, about 35 degrees, about 30 degrees, about 20 degrees, about 10 degrees, etc.).

While the agricultural product meter 52 is in the working position, the force of gravity on the second portion 166 of the first product control barrier 162 drives the second portion 166 to rotate to the illustrated position, thereby establishing the gap 170 between the second portion 166 and the outlet barrier 88. For example, while the agricultural product meter 52 is in the working position, the second portion 166 of the first product control barrier 162 may be substantially aligned with the vertical axis 112 of the agricultural product meter 52. However, as the agricultural product meter 52 rotates in the forward direction 18 toward the non-working position, the force of gravity drives the second portion 166 (e.g., a distal end of the second portion) toward the outlet barrier 88. Accordingly, the second portion 166 of the first product control barrier 162 (e.g., a distal end of the second portion) is configured to contact the outlet barrier 88 (e.g., the angled portion 96 of the outlet barrier 88) while the agricultural product meter 52 is in the non-working position, thereby substantially blocking flow of the agricultural product from the agricultural product storage area 72 into the outlet 64 (e.g., into the entrance 90 of the outlet 64).

In the illustrated embodiment, the product control assembly 160 includes a second product control barrier 174 that forms an end (e.g., upper end) of the agricultural product storage area 72. As illustrated, the second product control barrier 174 is spaced apart from the outlet barrier 88 (e.g., the substantially vertical portion 98 of the outlet barrier 88), thereby establishing a second gap 176. The second gap 176 enables the excess agricultural product to flow into the agricultural product storage area 72. For example, the excess agricultural product may flow along the path 172 from the product path 84 to the first gap 170, through the first gap 170 and the second gap 176, and into the agricultural product storage area 72. Furthermore, the first and second product control barriers are configured to cooperate to substantially block flow of the agricultural product from the agricultural product storage area 72 into the outlet 64 (e.g., into the outlet entrance 90) while the agricultural product meter 52 is in the non-working position.

In the illustrated embodiment, the second product control barrier 174 is angled downwardly toward the second gap 176 relative to the vertical axis 112 of the agricultural product meter 52, thereby directing the excess agricultural product toward the second gap 176 while the agricultural product meter 52 is in the illustrated working position. The second product control barrier 174 may be oriented at any suitable angle relative to the vertical axis 112 (e.g., about 90 degrees, about 85 degrees, about 80 degrees, about 75 degrees, about 70 degrees, about 65 degrees, about 60 degrees, about 55 degrees, about 50 degrees, about 45 degrees, about 40 degrees, about 35 degrees, about 30 degrees, about 20 degrees, about 10 degrees, etc.). Furthermore, in the illustrated embodiment, the second product control barrier 174 is coupled to the movable baffle 74' (e.g., having a different shape than the movable baffle disclosed above with reference to FIGS. 4-9). Accordingly, the second product control barrier 174 is configured to move with the movable baffle 74' between the selected positions. As previously discussed, in certain embodiments, the agricultural product meter may include a non-movable and interchangeable baffle. In such embodiments, the second product control barrier may be coupled to the non-movable and interchangeable baffle. Furthermore, in certain embodiments, the second product control barrier may be coupled to another suitable element of the agricultural product meter, such as the housing. In addition, in certain embodiments, the first portion of the first product control barrier may be coupled to the baffle (e.g., movable baffle) or another suitable element of the agricultural product meter, thereby indirectly coupling the first portion of the first product control barrier to the agricultural product meter housing.

As previously discussed, each barrier is configured to substantially block flow of the agricultural product across the barrier (e.g., with the exception of the recess in the outlet barrier). In the illustrated embodiment, the first portion of the first product control barrier includes a brush, and the second product control barrier includes a brush. A distal end of each brush is configured to be positioned proximate to the disc, such that the brush is spaced apart from the disc by a distance less than a minimum expected dimension of each particle (e.g., seed) of the agricultural product. In addition, each brush extends along a portion of the height of the respective barrier (e.g., extent of the barrier between the housing and the disc). However, in other embodiments, at least one brush may extend along the entire height of the respective barrier. Each brush is configured to substantially block agricultural product flow across the barrier without substantially interfering with rotation of the disc.

In the illustrated embodiment, the first portion 164 of the first product control barrier 162 is coupled to the housing 60 of the agricultural product meter 52 by two fasteners 178 (e.g., screws, bolts, etc.). While the first portion 164 of the first product control barrier 162 is coupled to the housing 60 by two fasteners 178 in the illustrated embodiment, in other embodiments, the first portion of the first product control barrier may be coupled to the housing by more or fewer fasteners (e.g., 1, 3, 4, 5, 6, or more). Furthermore, in certain embodiments, the first portion of the first product control barrier may be coupled to the housing by other suitable coupling system(s)/device(s) (e.g., alone or in combination with the fastener(s)), such as adhesive connection(s), latch(es), tab(s), hook(s), other suitable coupling system(s)/device(s), or a combination thereof. In addition, in certain embodiments, the first portion of the first product control barrier may be integrally formed with (e.g., integrally molded with) the housing.

In addition, in the illustrated embodiment, a portion of the second product control barrier 174 is integrally formed with a portion of the movable baffle 74'. In the illustrated embodiment, the movable baffle 74' includes a baffle plate 180 and a product engagement element 182. The product engagement element 182 is coupled to the baffle plate 180 by a fastener 184 (e.g., rivet, screw, bolt, etc.). While the product engagement element 182 is coupled to the baffle plate 180 by a single fastener 184 in the illustrated embodiment, in other embodiments, the product engagement element may be coupled to the baffle plate by additional fastener(s) (e.g., 1, 2, 3, 4, 5, 6, or more). Furthermore, in certain embodiments, the product engagement element may be coupled to the baffle plate by other suitable coupling system(s)/device(s) (e.g., alone or in combination with the fastener(s)), such as adhesive connection(s), latch(es), tab(s), hook(s), other suitable coupling system(s)/device(s), or a combination thereof. In addition, the product engagement element may be integrally formed with (e.g., integrally molded with) the baffle plate. As discussed in detail below, a portion of the second product control barrier 174 is integrally formed with the product engagement element 182. Accordingly, the second product control barrier 174 is coupled to the baffle plate 180 by the fastener 184, and the baffle plate 180 is movably coupled to the housing 60 of the agricultural product meter 52 by the fastener 76.

In certain embodiments, the product control assembly 160 may be sold as a kit (e.g., retrofit kit) having the first product control barrier 162, the second product control barrier 174, and at least a portion of the movable baffle 74' (e.g., the product engagement element 182 of the movable baffle 74', the entire movable baffle 74', etc.). By way of example, to install the product control assembly 160 within an agricultural product meter that does not include a product control assembly, the singulator bracket 86 may be removed from the housing 60. Next, an original movable baffle may be removed from the housing 60 by disengaging the baffle fastener 76. In certain embodiments, the original product engagement element of the original movable baffle may be removed from the original baffle plate by disengaging the original product engagement element fastener. In such embodiments, the illustrated product engagement element 182 and the second product control barrier 174 may be coupled to the baffle plate 180 of the original movable baffle, thereby forming the illustrated movable baffle 74'. The original product engagement element fastener may be used to couple the product engagement element 182 to the baffle plate 180 (e.g., in embodiments in which the original product engagement element fastener is reusable), or a new product engagement element fastener may be used to couple the product engagement element 182 to the baffle plate 180 (e.g., in embodiments in which the original product engagement element fastener is not reusable). While reusing the original baffle plate is disclosed above, in certain embodiments, the movable baffle 74' may include a new/different baffle plate (e.g., which may be coupled to the product engagement element during the product control assembly installation process or prior to the product control assembly installation process).

Once the movable baffle 74' is formed, the movable baffle 74' may be coupled to the housing 60 of the agricultural product meter 52 via the baffle fastener 76, thereby movably coupling the second product control barrier 174 to the housing 60. Next, the first portion 164 of the first product control barrier 162 may be coupled to the housing using the fasteners 178. The singulator bracket 86 may then be coupled to the housing 60. While the singulator bracket 86 is removed and reinstalled in the installation process disclosed above, in certain embodiments, the singulator bracket may remain coupled to the housing during the product control assembly installation process. Furthermore, while a portion of the second product control barrier is integrally formed with the product engagement element of the movable baffle in the illustrated embodiment, in other embodiments, the second product control barrier and the product engagement element may be formed separately. In such embodiments, the second product control barrier may be coupled to the product engagement element during the product control assembly installation process. Furthermore, in certain embodiments, the kit (e.g., retrofit kit) may include any or all of the fasteners disclosed above (e.g., the baffle fastener 76, the product engagement element fastener 184, the first product control barrier fasteners 178, or a combination thereof), other suitable fastener(s), other suitable connection element(s), or a combination thereof. While installing the product control assembly 160 via a kit is disclosed above, in certain embodiments, the product control assembly may be installed during the agricultural product meter manufacturing process. Furthermore, while the installation process is disclosed above with reference to the illustrated product control assembly 160, in certain embodiments, the installation process may be used to install any of the product control assemblies disclosed above with reference to FIGS. 4-9.

In the illustrated embodiment, the first product control barrier 162 includes one or more cutouts configured to facilitate movement of the movable baffle 74' between the selected positions. As discussed in detail below, the cutout(s) of the first product control barrier 162 are configured to establish respective gap(s) between the first product control barrier 162 and the housing 60, thereby enabling portion(s) of the baffle plate 180 to be positioned between the first product control barrier 162 and the housing 60 (e.g., at least while the movable baffle 74' is in one or more of the selected positions). While the first product control barrier includes one or more cutouts in the illustrated embodiment, in other embodiments (e.g., in embodiments in which the baffle plate is shaped to be spaced apart from the first product control barrier while the movable baffle is in each of the selected positions), the cutouts may be omitted.

In the illustrated embodiment, the first and second product control barriers overlap along the vertical axis 112 of the agricultural product meter 52 (e.g., a line extending parallel to the vertical axis 112 intersects the first product control barrier 162 and the second product control barrier 174). Furthermore, in response to rotation of the agricultural product meter 52 to the non-working position (e.g., in which the agricultural product meter 52 is oriented at an angle that enables a first portion of the agricultural product to engage the first product control barrier), the second portion 166 of the first product control barrier 162 (e.g., a distal end of the second portion 166) contacts the outlet barrier 88 (e.g., the angled portion 96 of the outlet barrier 88). In the illustrated embodiment, the second portion 166 of the first product control barrier 162 is shaped to substantially fill a space 186 between the first portion 164 of the first product control barrier 162 and the outlet barrier 88 (e.g., such that any unblocked portion of the space 186 has a maximum dimension less than a minimum expected dimension of each particle, such as a seed, of the agricultural product). As a result, while the second portion 166 of the first product control barrier 162 is in contact with the outlet barrier 88, the first portion of the agricultural product is substantially blocked from flowing from the agricultural product storage area 72 into the outlet 64 (e.g., into the entrance 90 of the outlet 64). Furthermore, the second product control barrier 174 substantially blocks a second portion of the agricultural product from flowing from the agricultural product storage area 72 into the outlet 64 (e.g., into the entrance 90 of the outlet 64). For example, a length and/or an orientation of the second product control barrier 174 may be particularly selected to substantially reduce or eliminate the possibility of the agricultural product flowing around the second product control barrier. Accordingly, the first and second product control barriers cooperate to substantially block flow of the agricultural product from the agricultural product storage area 72 into the outlet 64 while the agricultural product meter 52 is in the non-working position.

While the product control assembly 160 includes two product control barriers in the illustrated embodiment, in other embodiments, the second product control barrier may be omitted. In such embodiments (e.g., embodiments in which the singulator is omitted), the first portion of the first product control barrier may be extended away from the second portion of the first product control barrier, thereby enabling the first product control barrier to substantially block flow of the agricultural product from the agricultural product storage area into the outlet while the agricultural product meter is in the non-working position.

Figure 11:
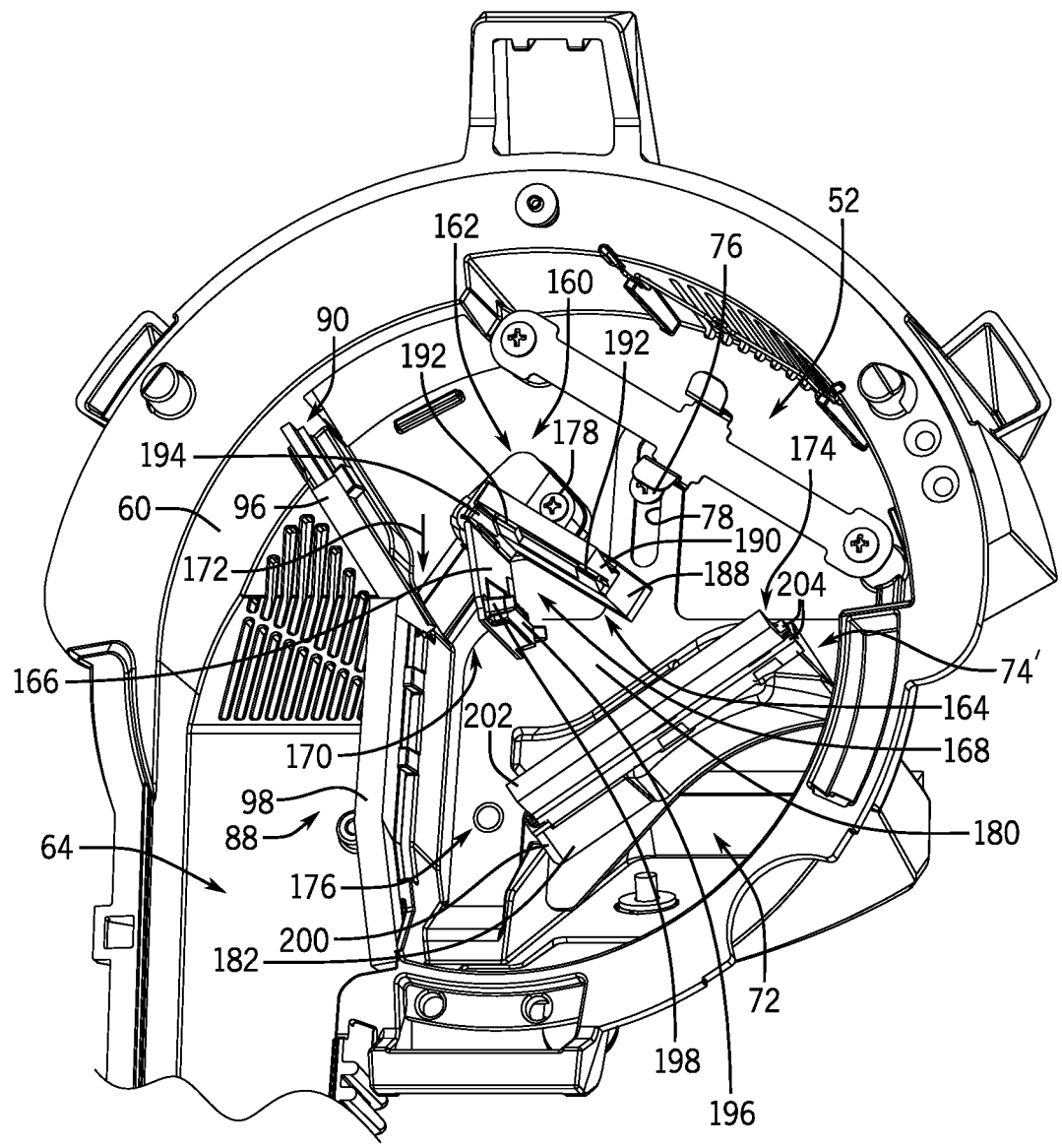
FIG. 11 is a perspective view of the product control assembly of FIG. 10.

FIG. 11 is a perspective view of the product control assembly 160 of FIG. 10. In the illustrated embodiment, the first portion 164 of the first product control barrier 162 includes a rigid element 188 and a brush 190 coupled to the rigid element 188. In the illustrated embodiment, the brush 190 is removably coupled to the rigid element 188 by three clips 192. However, in other embodiments, the brush may be coupled to the rigid element by more or fewer clips (e.g., 1, 2, 4, 5, 6, or more). Furthermore, in certain embodiments, the brush may be coupled to the rigid element by other suitable coupling system(s)/device(s) (e.g., alone or in combination with the clip(s)), such as adhesive connection(s), latch(es), fastener(s), other suitable coupling system(s)/device(s), or a combination thereof. In addition, in certain embodiments, the rigid element may be molded (e.g., injection molded) around the brush (e.g., via an over-molding process), thereby coupling the brush to the rigid element. A distal end of the brush 190 is configured to be positioned proximate to the disc, such that the brush 190 is spaced apart from the disc by a distance less than a minimum expected dimension of each particle (e.g., seed) of the agricultural product. As a result, the brush 190 may substantially block agricultural product flow across the first portion 164 of the first product control barrier 162 without substantially interfering with rotation of the disc. In addition, an extension 194 of the rigid element 188 is spaced apart from the disc by a distance less than a minimum expected dimension of each particle (e.g., seed) of the agricultural product. As a result, the extension 194 of the rigid element 188 may substantially block flow of the agricultural product across the extension without interfering with rotation of the disc. While the first portion 164 of the first product control barrier 162 includes the rigid element 188 and the brush 190 in the illustrated embodiment, in other embodiments, the first portion of the first product control barrier may only include a brush, or the first portion of the first product control barrier may only include a rigid element.

In the illustrated embodiment, the second portion 166 of the first product control barrier 162 is formed as a rigid element. The second portion 166 is spaced apart from the disc by a distance less than a minimum expected dimension of each particle (e.g., seed) of the agricultural product. As a result, while the agricultural product meter is in the non-working position, the second portion 166 may substantially block flow of the agricultural product across the second portion without interfering with rotation of the disc. While the second portion 166 of the first product control barrier 162 is formed as a rigid element in the illustrated embodiment, in other embodiments, the second portion of the first product control barrier may include a rigid element and a brush, or the second portion of the first product control barrier may only include a brush.

In addition, the second portion 166 is pivotally coupled to the rigid element 188 of the first portion 164 by the living hinge 168. For example, the rigid element 188 of the first portion 164 and the second portion 166 may be formed by a molding process (e.g., injection molding process, etc.) as a single element. In addition, a third portion may be formed by the molding process between the second portion and the rigid element of the first portion, in which the third portion is thinner than the second portion and the rigid element (e.g., the extension of the rigid element) of the first portion, thereby forming a living hinge between the first and second portions. In certain embodiments, the second portion may be pivotally cycled during the manufacturing process (e.g., after molding while the first product control barrier is still warm) to increase the flexibility and longevity of the living hinge.

In the illustrated embodiment, a weight 196 (e.g., metal bar, metal slug, etc.) is coupled to the second portion 166 of the first product control barrier 162 to urge the second portion downwardly, thereby urging the second portion 166 away from the outlet barrier 88 (e.g., the angled portion 96 of the outlet barrier 88) while the agricultural product meter 52 is in the illustrated working position. In the illustrated embodiment, the weight 196 is removably coupled to the second portion 166 by two clips 198. However, in other embodiments, the weight may be coupled to the second portion by more or fewer clips (e.g., 1, 3, 4, 5, 6, or more). Furthermore, in certain embodiments, the weight may be coupled to the second portion by other suitable coupling system(s)/device(s) (e.g., alone or in combination with the clip(s)), such as adhesive connection(s), latch(es), fastener(s), other suitable coupling system(s)/device(s), or a combination thereof. In addition, in certain embodiments, the second portion may be formed around the weight during the molding process, such that the weight is positioned within an interior of the second portion. While a single weight is coupled to the second portion of the first product control barrier in the illustrated embodiment, in other embodiments, more or fewer weights may be coupled to the second portion (e.g., 0, 2, 3, 4, or more). For example, in certain embodiments, the weight may be omitted.

As previously discussed, a portion of the second product control barrier 174 is integrally formed with the product engagement element 182 of the movable baffle 74'. In the illustrated embodiment, the second product control barrier 174 includes a rigid element 200 and a brush 202 coupled to the rigid element 200, and the rigid element 200 is integrally formed with the product engagement element 182 of the movable baffle 74'. While the rigid element 200 is integrally formed with the product engagement element 182 of the movable baffle 74' in the illustrated embodiment, in other embodiments, the rigid element may be coupled to the product engagement element by suitable coupling system(s)/device(s).

Furthermore, in the illustrated embodiment, the brush 202 is removably coupled to the rigid element 200 by three clips 204. However, in other embodiments, the brush may be coupled to the rigid element by more or fewer clips (e.g., 1, 2, 4, 5, 6, or more). In addition, in certain embodiments, the brush may be coupled to the rigid element by other suitable coupling system(s)/device(s) (e.g., alone or in combination with the clip(s)), such as adhesive connection(s), latch(es), fastener(s), other suitable coupling system(s)/device(s), or a combination thereof. In certain embodiments, the brush may be coupled to the rigid element during the product control assembly installation process disclosed above (e.g., before the movable baffle is coupled to the housing). Furthermore, in certain embodiments, the brush 202 may be removed from the rigid element 200 (e.g., by disengaging the clips 204) to enable the agricultural product to bypass the second product control barrier. Enabling the agricultural product to bypass the second product control barrier may enhance operation of the agricultural product meter for certain types of agricultural product. Furthermore, in embodiments in which the second product control barrier only includes a brush, the brush may be removable from the corresponding structure (e.g., the movable baffle, etc.) of the agricultural product meter. While the removable brush is disclosed above with reference to the illustrated product control assembly, the second product control barrier of at least one of the product control assemblies disclosed above with reference to FIGS. 4-9 may include a removable brush.

A distal end of the brush 202 is configured to be positioned proximate to the disc, such that the brush 202 is spaced apart from the disc by a distance less than a minimum expected dimension of each particle (e.g., seed) of the agricultural product. As a result, the brush 202 may substantially block agricultural product flow across the second product control barrier 174 without substantially interfering with rotation of the disc. While the second product control barrier 174 includes the rigid element 200 and the brush 202 in the illustrated embodiment, in other embodiments, the second product control barrier may only include a brush, or the second product control barrier may only include a rigid element. In embodiments in which the second product control barrier only includes a rigid element, the rigid element may be spaced apart from the disc by a distance less than a minimum expected dimension of each particle (e.g., seed) of the agricultural product. As a result, the rigid element may substantially block flow of the agricultural product across the second product control barrier without interfering with rotation of the disc. Furthermore, in certain embodiments, at least one barrier/portion (e.g., the second product control barrier, the first portion of the first product control barrier, the second portion of the first product control barrier, etc.) may only include a rigid element, and the rigid element may include a bearing surface (e.g., formed from a polymeric material, such as polytetrafluoroethylene) configured to contact the disc and to reduce friction between the barrier and the disc. Accordingly, the barrier may substantially block flow of the agricultural product across the barrier without substantially interfering with rotation of the disc.

Figure 12:
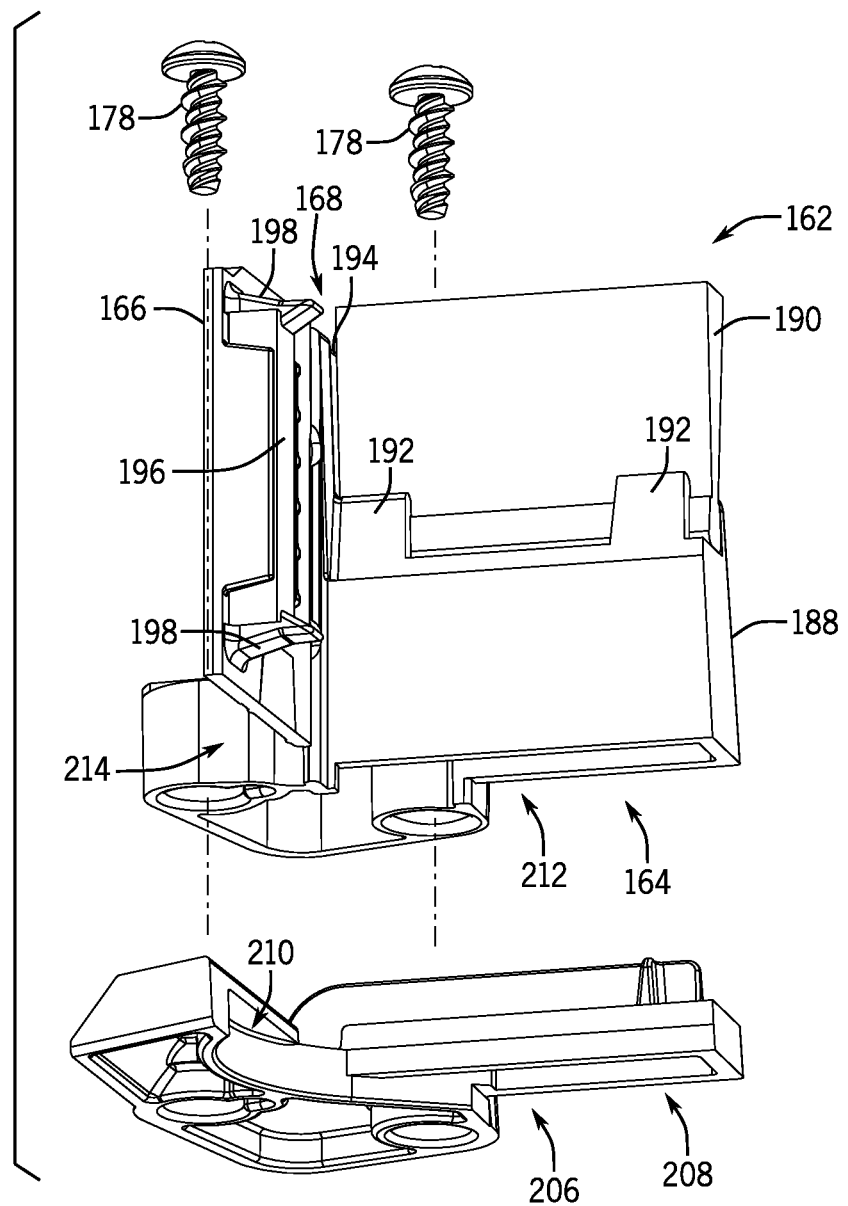
FIG. 12 is an exploded view of a first product control barrier of the product control assembly of FIG. 10.

FIG. 12 is an exploded view of the first product control barrier 162 of the product control assembly of FIG. 10. In the illustrated embodiment, the first product control barrier 162 includes a removable spacer 206 configured to selectively increase the extent of the first product control barrier 162 along a width (e.g., thickness) of the agricultural product meter housing. For example, for a thinner/narrower housing (e.g., a housing configured to interface with a powered agricultural product conveyor), the spacer may be omitted, and for a thicker/wider housing (e.g., a housing configured to interface with a seed tube), the spacer may be added. As a result, a single assembly having the first portion, the second portion, and the hinge may be used for multiple housing widths/thicknesses, thereby reducing the design and manufacturing cost of the product control assembly. While the first product control barrier 162 includes a single spacer 206 in the illustrated embodiment, in other embodiments, multiple spacers may be used to establish a target extent of the first product control barrier along the width/thickness of the agricultural product meter housing. As previously discussed, with the target extent established, the brush 190 and the second portion 166 may be spaced apart from the disc by a distance less than a minimum expected dimension of each particle (e.g., seed) of the agricultural product. While spacer(s) are disclosed above with reference to the first product control barrier 162 of the embodiment of FIGS. 10-12, the first product control barrier of at least one of the product control assemblies disclosed above with reference to FIGS. 4-9 may include one or more spacers. In addition, while spacer(s) are used to control the extent of the first product control barrier 162 in the illustrated embodiment, in other embodiments, first product control barriers of different extents may be utilized for housings having different widths/thicknesses.

In the illustrated embodiment, the spacer 206 includes a first cutout 208 and a second cutout 210. Accordingly, if the spacer is utilized to establish a target extent of the first product control barrier, the cutouts of the spacer 206 establish respective gaps between the first product control barrier 162 and the housing of the agricultural product meter, thereby enabling portions of the baffle plate to be positioned between the first product control barrier 162 and the housing (e.g., at least while the movable baffle is in one or more of the selected positions). While the spacer 206 includes two cutouts in the illustrated embodiment, in other embodiments the spacer may include more or fewer cutouts (e.g., 1, 3, 4, or more). Furthermore, in certain embodiments, (e.g., in embodiments in which the baffle plate is shaped to be spaced apart from the first product control barrier while the movable baffle is in each of the selected positions), the cutouts may be omitted.

Furthermore, in the illustrated embodiment, the rigid element 188 of the first portion 164 includes a cutout 212, and the second portion 166 includes a cutout 214. Accordingly, if the spacer is omitted, the cutouts of the first and second portions establish respective gaps between the first product control barrier 162 and the housing of the agricultural product meter, thereby enabling portions of the baffle plate to be positioned between the first product control barrier 162 and the housing (e.g., at least while the movable baffle is in one or more of the selected positions). In the illustrated embodiment, the cutout 214 of the second portion 166 is formed by the hinge 168, which positions the second portion 166 above the housing. However, in other embodiments, the cutout of the second portion may be formed in another suitable manner (e.g., via the shape of the second portion). While the first product control barrier 162 includes two cutouts in the illustrated embodiment, in other embodiments the first product control barrier may include more or fewer cutouts (e.g., 1, 3, 4, or more). Furthermore, in certain embodiments, (e.g., in embodiments in which the baffle plate is shaped to be spaced apart from the first product control barrier while the movable baffle is in each of the selected positions), the cutouts may be omitted. While cutout(s) are disclosed above with reference to the first product control barrier 162 of the embodiment of FIGS. 10-12, the first product control barrier of at least one of the product control assemblies disclosed above with reference to FIGS. 4-9 may include one or more cutouts.

While each product control barrier is substantially straight in the embodiments of the product control assemblies disclosed above with reference to FIGS. 4-12, in certain embodiments, at least one product control barrier of at least one embodiment of a product control assembly may have another suitable shape (e.g., curved, wavy, polygonal, etc.). Furthermore, with regard to the embodiments of the product control assemblies disclosed above with reference to FIGS. 4-12, the second product control barrier may be configured to block overfilling of the agricultural product storage area while the agricultural product meter is in the working position (e.g., while the agricultural implement is moving over rough terrain). In addition, with regard to each brush disclosed above, in certain embodiments, the brush may be configured to facilitate passage of seed fragments and/or other debris across the respective barrier while substantially blocking agricultural product flow across the respective barrier. Furthermore, in certain embodiments, a flap formed from resilient material (e.g., rubber, soft polymeric material, etc.) may be used in place of (e.g., instead of) at least one of the brushes disclosed above (e.g., any of the brushes disclosed above). In such embodiments, the flap may be configured to facilitate passage of seed fragments and/or other debris across the respective barrier while substantially blocking agricultural product flow across the respective barrier. In addition, as used herein with regard to the second portion of the first product control barrier (e.g., the second portion 104 of the first product control barrier 100, the second portion 166 of the first product control barrier 162), "contact" refers to direct contact between the second portion of the first product control barrier and the outlet barrier, or indirect contact (e.g., contact between the second portion of the first product control barrier and another object, such as a stop, a protrusion, etc.) that causes the space between the first portion of the first product control barrier and the outlet barrier to be substantially filled (e.g., such that any unblocked portion of the space has a maximum dimension less than a minimum expected dimension of each particle, such as a seed, of the agricultural product).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A product control assembly for an agricultural product meter, comprising:
a first product control barrier configured to extend along a product path toward an outlet barrier, wherein the product path extends from an agricultural product storage area to an outlet, the outlet barrier is configured to form a portion of the outlet, the first product control barrier includes a first portion and a second portion, the first portion is configured to couple to a housing of the agricultural product meter, the second portion is pivotally coupled to the first portion, the second portion is configured to contact the outlet barrier while the agricultural product meter is in a non-working position to substantially block flow of agricultural product from the agricultural product storage area into the outlet, and the second portion is configured to be spaced apart from the outlet barrier while the agricultural product meter is in a working position to enable excess agricultural product to flow through a gap between the second portion and the outlet barrier from the product path to the agricultural product storage area; and
a second product control barrier configured to form an end of the agricultural product storage area, wherein the second product control barrier is configured to be spaced apart from the outlet barrier to enable the excess agricultural product to flow into the agricultural product storage area, and the first and second product control barriers are configured to cooperate to substantially block flow of the agricultural product from the agricultural product storage area into the outlet while the agricultural product meter is in the non-working position.

2. The product control assembly of claim 1, comprising a living hinge pivotally coupling the first and second portions of the first product control barrier.

3. The product control assembly of claim 1, wherein the second portion of the first product control barrier is shaped to substantially fill a space between the first portion of the first product control barrier and the outlet barrier while the second portion of the first product control barrier is in contact with the outlet barrier.

4. The product control assembly of claim 1, wherein the first product control barrier comprises a spacer configured to selectively increase an extent of the first product control barrier along a width of the housing.

5. The product control assembly of claim 1, wherein the first product control barrier has a cutout configured to establish a gap between the first product control barrier and the housing.

6. The product control assembly of claim 1, wherein the first product control barrier comprises a brush.

7. The product control assembly of claim 1, wherein the second product control barrier is configured to couple to a movable baffle of the agricultural product meter.

8. The product control assembly of claim 1, wherein the second product control barrier comprises a brush.

9. A product control assembly for an agricultural product meter, comprising:
a first product control barrier configured to extend from an outlet barrier toward an agricultural product storage area, wherein the outlet barrier is configured to form a portion of an outlet of the agricultural product meter; and
a second product control barrier configured to form an end of the agricultural product storage area, wherein the first product control barrier is configured to be spaced apart from the second product control barrier to enable excess agricultural product to flow from a product path to the agricultural product storage area, the second product control barrier is configured to be spaced apart from the outlet barrier to enable the excess agricultural product to flow into the agricultural product storage area, the first and second product control barriers overlap along a vertical axis fixed to the agricultural product meter and extending along a direction of gravitational acceleration while the agricultural product meter is in a working position, and the first and second product control barriers are configured to cooperate to substantially block flow of agricultural product from the agricultural product storage area into the outlet while the agricultural product meter is in a non-working position.

10. The product control assembly of claim 9, wherein the first product control barrier is configured to extend from an angled portion of the outlet barrier.

11. The product control assembly of claim 9, wherein the first product control barrier is configured to extend from an intersection between an angled portion of the outlet barrier and a substantially vertical portion of the outlet barrier.

12. The product control assembly of claim 9, wherein the second product control barrier is configured to couple to a movable barrier of the agricultural product meter.

13. An agricultural product meter, comprising:
a housing;
a disc disposed within the housing, wherein the disc is configured to move agricultural product along a product path from an agricultural product storage area to an outlet;
an outlet barrier forming a portion of the outlet; and
a product control assembly, comprising:
  a first product control barrier extending along the product path toward the outlet barrier, wherein the first product control barrier includes a first portion and a second portion, the first portion is coupled to the housing, the second portion is pivotally coupled to the first portion, the second portion is configured to contact the outlet barrier while the agricultural product meter is in a non-working position to substantially block flow of the agricultural product from the agricultural product storage area into the outlet, and the second portion is configured to be spaced apart from the outlet barrier while the agricultural product meter is in a working position to enable excess agricultural product to flow through a gap between the second portion and the outlet barrier from the product path to the agricultural product storage area; and
  a second product control barrier forming an end of the agricultural product storage area, wherein the second product control barrier is spaced apart from the outlet barrier to enable the excess agricultural product to flow into the agricultural product storage area, and the first and second product control barriers are configured to cooperate to substantially block flow of the agricultural product from the agricultural product storage area into the outlet while the agricultural product meter is in the non-working position.

14. The agricultural product meter of claim 13, wherein the product control assembly comprises a living hinge pivotally coupling the first and second portions of the first product control barrier.

15. The agricultural product meter of claim 13, wherein the second portion of the first product control barrier is shaped to substantially fill a space between the first portion of the first product control barrier and the outlet barrier while the second portion of the first product control barrier is in contact with the outlet barrier.

16. The agricultural product meter of claim 13, wherein the first product control barrier comprises a spacer configured to selectively increase an extent of the first product control barrier along a width of the housing.

17. The agricultural product meter of claim 13, wherein the first product control barrier has a cutout configured to establish a gap between the first product control barrier and the housing.

18. The agricultural product meter of claim 13, wherein the first product control barrier comprises a brush.

19. The agricultural product meter of claim 13, comprising a movable baffle, wherein the second product control barrier is coupled to the movable baffle.

20. The agricultural product meter of claim 13, wherein the second product control barrier comprises a brush.

* * * * *